US012422739B2

(12) United States Patent
Choi et al.

(10) Patent No.: US 12,422,739 B2
(45) Date of Patent: Sep. 23, 2025

(54) ELECTRONIC DEVICE, CONTENTS SEARCHING SYSTEM AND SEARCHING METHOD THEREOF

(71) Applicant: SAMSUNG ELECTRONICS CO., LTD., Suwon-si (KR)

(72) Inventors: Eunseok Choi, Suwon-si (KR); Byungseok Soh, Suwon-si (KR); Sungho Chae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 466 days.

(21) Appl. No.: 17/972,264

(22) Filed: Oct. 24, 2022

(65) Prior Publication Data

US 2023/0037686 A1 Feb. 9, 2023

Related U.S. Application Data

(63) Continuation of application No. PCT/KR2022/007408, filed on May 25, 2022.

(30) Foreign Application Priority Data

Aug. 4, 2021 (KR) .................. 10-2021-0102623
Apr. 5, 2022 (KR) .................. 10-2022-0042507

(51) Int. Cl.
*G03B 21/14* (2006.01)
*G03B 43/00* (2021.01)

(52) U.S. Cl.
CPC ........... *G03B 21/147* (2013.01); *G03B 43/00* (2013.01)

(58) Field of Classification Search
CPC ...... G03B 21/14; G03B 21/56; G03B 21/145; G03B 21/147; G03B 21/208;
(Continued)

(56) References Cited

U.S. PATENT DOCUMENTS 6,520,647 B2  2/2003  Raskar
7,690,797 B2  4/2010  Higashi
(Continued)

FOREIGN PATENT DOCUMENTS

JP  4422074 B2  2/2010
JP  4774826 B2  9/2011
(Continued)

OTHER PUBLICATIONS

International Search Report and Written Opinion dated Aug. 25, 2022, issued by the International Searching Authority in counterpart International Application No. PCT/KR2022/007408 (PCT/ISA/210 and PCT/ISA/237).
(Continued)

*Primary Examiner* — Sultan Chowdhury
(74) *Attorney, Agent, or Firm* — Sughrue Mion, PLLC

(57) ABSTRACT

An electronic apparatus includes a main body, a projector, a plurality of sensors including an acceleration sensor that detects a sensing value, and a plurality of distance sensors that detect a distance value between the electronic apparatus and a screen, a support connected to the main body, and a processor configured to identify a vertical angle by which the electronic apparatus is tilted, based on a sensing value detected by the acceleration sensor, identify a rotation angle by which the electronic apparatus is rotated based on a distance value detected by the plurality of distance sensors, perform a function corresponding to a keystone correction on an image to provide a modified image, identify a size of the modified image based on the vertical angle or the rotation angle, and control the projector to project the modified image based on the size of the modified image.

17 Claims, 18 Drawing Sheets

(58) Field of Classification Search
CPC ............ G03B 21/2046; G03B 21/2053; G03B 43/00; H04N 9/3141; H04N 9/3185; H04N 9/3191; H04N 9/3194
See application file for complete search history.

(56) References Cited

U.S. PATENT DOCUMENTS

| | | |
|---|---|---|
| 8,994,714 B2 | 3/2015 | Erinjippurath et al. |
| 9,158,184 B2 | 10/2015 | Tsuji et al. |
| 11,336,878 B2 | 5/2022 | Yoon et al. |
| 11,716,452 B2 | 8/2023 | Yoon et al. |
| 2009/0033888 A1 | 2/2009 | Nozaki et al. |
| 2010/0103385 A1 | 4/2010 | Kubota |
| 2012/0075348 A1 | 3/2012 | Kasahara et al. |
| 2013/0107227 A1 | 5/2013 | Tsij et al. |
| 2016/0173842 A1 | 6/2016 | De La Cruz et al. |
| 2016/0249027 A1* | 8/2016 | Jurik ................. F16M 11/2014 |
| 2019/0087946 A1* | 3/2019 | Chiba ................. G03B 21/147 |
| 2020/0120319 A1 | 4/2020 | Wu et al. |
| 2020/0213568 A1* | 7/2020 | Ozawa ................. H04N 9/3185 |
| 2021/0314538 A1 | 10/2021 | Yoon et al. |
| 2022/0247986 A1 | 8/2022 | Yoon et al. |

FOREIGN PATENT DOCUMENTS

| | | |
|---|---|---|
| JP | 5728866 B2 | 6/2015 |
| JP | 5891714 B2 | 3/2016 |
| KR | 10-1995-0022916 A | 7/1995 |
| KR | 10-2006-0098177 A | 9/2006 |
| KR | 10-2014-0100105 A | 8/2014 |
| KR | 10-2016-0077551 A | 7/2016 |
| KR | 10-2017-0044387 A | 4/2017 |
| KR | 10-2019-0135147 A | 12/2019 |
| KR | 10-2124475 B1 | 6/2020 |
| KR | 10-2021-0123059 A | 10/2021 |
| KR | 10-2023-0006996 A | 1/2023 |

OTHER PUBLICATIONS

Communication dated Aug. 16, 2024, issued by the European Patent Office in European Application No. 22853242.0.

* cited by examiner

FIG. 5

| Roll ANGLE | Pitch ANGLE | Yaw ANGLE | |
|---|---|---|---|
| 31 | 41 | 51 | BEFORE KEYSTONE CORRECTION |
| 30 | 40 | 50 | AFTER KEYSTONE CORRECTION |
| 32 | 42 | 52 | BEFORE KEYSTONE CORRECTION |

ELECTRONIC DEVICE, CONTENTS SEARCHING SYSTEM AND SEARCHING METHOD THEREOF

CROSS-REFERENCE TO RELATED APPLICATIONS

This application is a Bypass Continuation Application of International Application No. PCT/KR2022/007408 designating the United States, filed on May 25, 2022, in the Korean Intellectual Property Receiving Office and claiming priority to Korean Patent Application No. 10-2021-0102623, filed Aug. 4, 2021, and priority to Korean Patent Divisional Application No. 10-2022-0042507, filed Apr. 5, 2022 in the Korean Intellectual Property Office, the disclosures of which are incorporated by reference herein in their entireties.

BACKGROUND

1. Field

The disclosure relates to an electronic apparatus for processing images and a method thereof, and more particularly, to an electronic apparatus that performs a keystone correction for preventing warping of display of an image, and an image processing method thereof.

2. Description of Related Art

Recently, various projectors are being utilized with the development of electronic technologies and optical technologies. A projector is an electronic apparatus that projects a light on a screen or a projection surface, and forms an image formed on the screen.

In the case of viewing an image by using a projector, if the projector is placed upright on a plane surface in a direction of a screen, a rectangular image is displayed on the screen. However, in some cases, warping in an up-down direction or a left-right direction occurs, or an image in a rotated state appears on the screen. Such warping is referred to as a keystone effect.

In related art systems, a projector may photograph a screen by using an image sensor, process the photographed image, calculate the warped angle between the screen and the projector, and project an image based on the calculated warped angle. In this case, a calibration process of making the optical axis of the projector and the measurement axis of the image sensor coincide needs to be performed, and if an error is generated in this calibration process, a large influence is exerted on the angle calculation. Also, in the process of processing the photographed image at the image sensor, there is also a problem that a large amount of calculation is required. In particular, in the case of an ultra short throw beam projector that is recently being developed, the distance between the projection surface and the projector is very close, and thus a camera with a wide angle lens attached is needed to view the entire screen with the image sensor. However, in this case, warping becomes severe and calibration of the optical axis and the measurement axis of the image sensor is not easy, and accordingly, errors increase. Moreover, in the case of an ultra short throw beam projector, even if only small warping is generated, an image projected on the screen may be warped greatly due to the characteristic of the product. Thus, precise measurement of an angle is required, but there is a limitation in a method of using an image sensor.

Also, in the case of projecting an image for which a keystone correction was performed on a screen, the size of the image varies according to the distance between the screen and the projector. In the past, there was also a problem that it was hard to fit an image for which a keystone correction was performed to the size of the screen.

SUMMARY

Provided is an electronic apparatus that performs a keystone correction by using an acceleration sensor and a distance sensor, and adjusts a size of an image according to a distance to a screen, and an image processing method thereof. However, the disclosure is not limited thererto, and as such, other aspects of the disclosure may directed to other features.

According to an aspect of the disclosure, there is provided an electronic apparatus including: a main body; a projector; a plurality of sensors including: an acceleration sensor configured to detect a sensing value, and a plurality of distance sensors configured to detect a distance value between the electronic apparatus and a screen; a support structure connected to an outer side surface of the main body through a hinge structure so that the main body is rotatable about the hinge structure, the support structure configured to support the main body on a supporting surface; and a processor configured to: identify a vertical angle by which the electronic apparatus is tilted due to a direction of gravity, based on the sensing value detected by the acceleration sensor, identify a rotation angle by which the electronic apparatus is rotated based on a distance between the screen and the electronic apparatus based on the distance value detected by the plurality of distance sensors, perform a function corresponding to a keystone correction on an image to provide a modified image, identify a size of the modified image based on at least one of the vertical angle or the rotation angle, and control the projector to project the modified image on the screen based on the identified size of the modified image.

According to an aspect of the disclosure, there is provided a method for controlling an electronic apparatus, the method including: identifying a vertical angle by which the electronic apparatus is tilted due to a direction of gravity based on a sensing value detected by an acceleration sensor, the electronic apparatus including a main body and a support structure connected an outer side surface of the main body through a hinge structure so that the main body is rotatable about the hinge structure; identifying a rotation angle by which the electronic apparatus is rotated based on a distance between a screen and the electronic apparatus based on a distance value detected by a plurality of distance sensors; performing a function corresponding to a keystone correction on an image to provide a modified image; identifying a size of the modified image based on at least one of the vertical angle or the rotation angle; and projecting the modified image on the screen based on the identified size of the modified image.

According to an aspect of the disclosure, there is provided a non-transitory computer-readable storage medium having recorded thereon a program that is executed by a processor of an electronic apparatus to perform a method including: identifying a vertical angle by which the electronic apparatus is tilted due to a direction of gravity based on a sensing value detected by an acceleration sensor, the electronic apparatus including a main body and a support structure connected an outer side surface of the main body through a hinge structure so that the main body is rotatable about the hinge structure; identifying a rotation angle by which the electronic apparatus is rotated based on a distance between a screen and the electronic apparatus based on a distance value detected by a plurality of distance sensors; performing a function corresponding to a keystone correction on an image to provide a modified image; identifying a size of the modified image based on at least one of the vertical angle or the rotation angle; and projecting the modified image on the screen based on the identified size of the modified image.

According to the various embodiments of the disclosure as above, a keystone correction can be performed effectively without an image sensor. Also, an image for which a keystone correction was performed can be displayed in an optimal size in a screen.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 5 is a diagram for illustrating a keystone correction method according to an embodiment of the disclosure;

DETAILED DESCRIPTION

Figure 1:
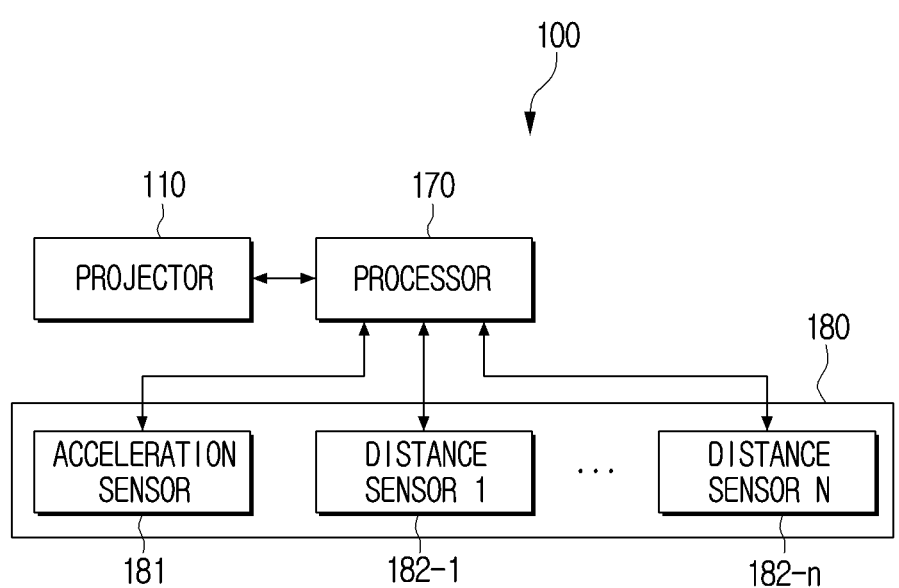
FIG. 1 is a block diagram illustrating a configuration of an electronic apparatus according to an embodiment of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include various modifications, equivalents, and/or alternatives of the embodiments of the disclosure. Also, with respect to the detailed description of the drawings, similar components may be designated by similar reference numerals.

Further, in describing the disclosure, in case it is determined that detailed explanation of related known functions or features may unnecessarily confuse the gist of the disclosure, the detailed explanation will be omitted.

In addition, the embodiments described below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Also, the terms used in the disclosure are used only to explain specific embodiments, and are not intended to limit the scope of the disclosure. Further, singular expressions include plural expressions, unless defined obviously differently in the context.

In addition, in the disclosure, expressions such as "have," "may have," "include," and "may include" denote the existence of such characteristics (e.g.: elements such as numbers, functions, operations, and components), and do not exclude the existence of additional characteristics.

Further, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) only A, (2) only B, or (3) both A and B.

Also, the expressions "first," "second," and the like used in the disclosure may describe various elements regardless of any order and/or degree of importance. Also, such expressions are used only to distinguish one element from another element, and are not intended to limit the elements.

The description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. The term "configured to" does not necessarily mean that an apparatus is "specifically designed to" in terms of hardware.

Instead, under some circumstances, the expression "an apparatus configured to" may mean that the apparatus "is capable of" performing an operation together with another apparatus or component. For example, the phrase "a processor configured (or set) to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Further, in the embodiments of the disclosure, 'a module' or 'a part' may perform at least one function or operation, and may be implemented as hardware or software, or as a combination of hardware and software. Also, a plurality of 'modules' or 'parts' may be integrated into at least one module and implemented as at least one processor, excluding 'a module' or 'a part' that needs to be implemented as specific hardware.

Various elements and areas in the drawings were illustrated schematically. Accordingly, the technical idea of the disclosure is not limited by the relative sizes or intervals illustrated in the accompanying drawings.

Hereinafter, various embodiments of the disclosure will be described in detail by using the accompanying drawings.

FIG. 1 is a block diagram illustrating a configuration of an electronic apparatus according to an embodiment of the disclosure. In this embodiment, an electronic apparatus 100 may be implemented as a projector that projects an image on a wall or a screen, or a display apparatus equipped with an image projection function, and thus the electronic apparatus will be described by being generally referred to as the electronic apparatus 100.

The electronic apparatus 100 in FIG. 1 includes a projector 110, a processor 170, and a plurality of sensors 180. According to an embodiment, the plurality of sensors 180 may be provided in a sensor module housing the plurality of sensors.

The projector 110 is a component for projecting a light for expressing an image to the outside. The projector 110 may include various detailed components such as a light source, a projection lens, a reflector, etc. The operating method and the detailed components of the projector 110 will be described in detail again in the parts described below.

The plurality of sensors 180 may include an acceleration sensor 181 and distance sensors 182-1-182-n. As an example, the distance sensors 182-1-182-n may be included in the plurality of sensors 180 as one or a plurality of distance sensors.

The acceleration sensor 181 is a component for detecting an angle by which the electronic apparatus 100 rotated in the direction of gravity. As an example, a tri-axis acceleration sensor is used. A tri-axis acceleration sensor measures acceleration of gravity for each axis, and provides raw data to the processor 170.

The plurality of distance sensors 182-1-182-n are components for detecting a distance with an external object. A distance sensor may be implemented in various types such as an ultrasonic sensor, an infrared sensor, a LIDAR sensor, a RADAR sensor, a photo diode sensor, etc. In case a plurality of distance sensors are provided, the processor 170 may acquire an angle by which an image output by the electronic apparatus 100 is rotated (or, warped) based on the screen 10 based on distances detected by each distance sensor. According to an embodiment, the processor 170 may acquire the angle based on a relationship between electronic apparatus and the screen based on distances detected by each distance sensor. Here the distances detected by each distance sensor corresponds to a distance between electronic apparatus and the screen.

According to an embodiment, the processor 170 may perform overall control operations or image processing operations for the electronic apparatus 100. For example, the processor 170 performs a keystone correction for an image based on results detected at each distance sensor. The processor 170 displays the size of the image for which the keystone correction was performed appropriately to fit the size of the screen. Specifically, the processor 170 respectively calculates a pitch angle, a roll angle, and a yaw angle of the electronic apparatus 100 by using detection results of the acceleration sensor 181 and the plurality of distance sensors 182-1-182-n. The processor 170 assumes the posture of the electronic apparatus 100 by using the calculated angles, and converts the image based on information such as the assumed posture and the distance to the screen, etc. Accordingly, the image in a maximum possible size may be displayed on a screen 10 (FIG. 2) without warping, and in case the image is displayed to be bigger than the size of the screen 10 in a far off distance, the image may be displayed in a reduced size to fit the size of the screen 10. As a result, the user can view the image in the maximum size and resolution within the size range of the screen 10, and thus satisfaction in viewing becomes higher.

Figure 2:
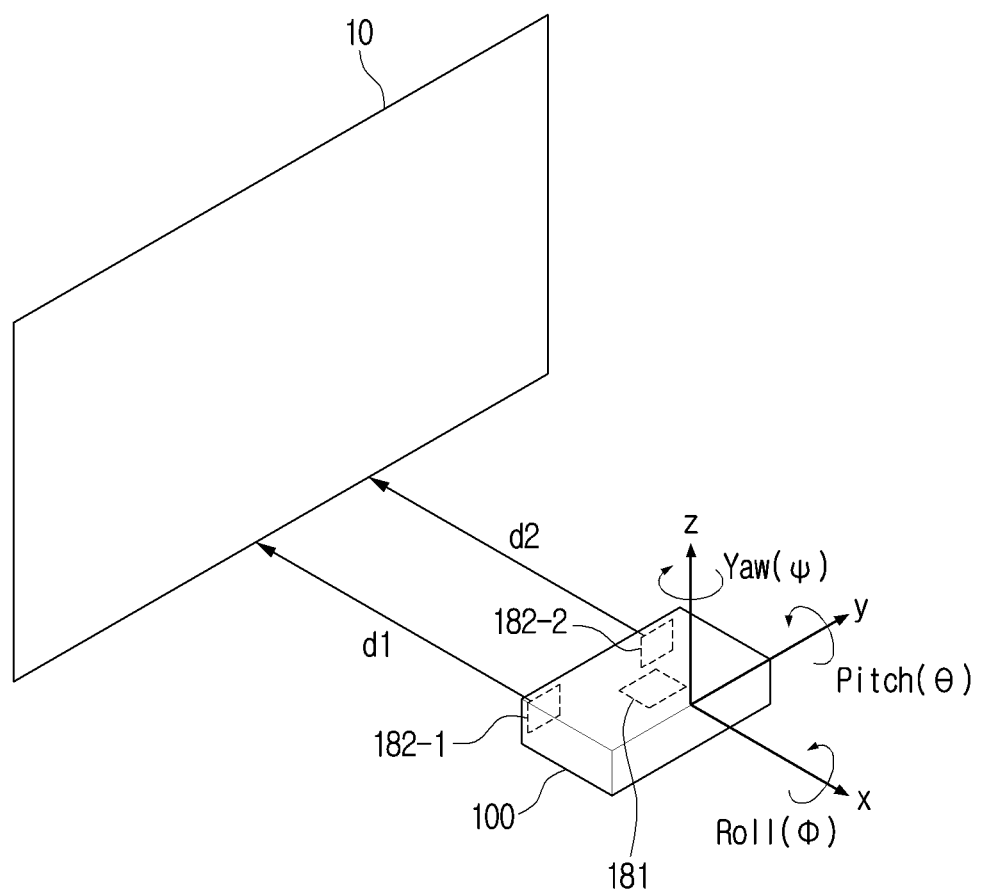
FIG. 2 is a diagram for illustrating an operation of the electronic apparatus in FIG. 1.

FIG. 2 is a diagram for illustrating examples of arrangement locations of the sensors and an operation of the electronic apparatus in FIG. 1. As illustrated in FIG. 2, if x, y, and z axes are defined based on the electronic apparatus 100, a pitch angle θ rotating based on the y axis, a roll angle φ rotating based on the x axis, and a yaw angle ψ rotating based on the z axis are respectively defined. In FIG. 2, the acceleration sensor 181 is housed inside the electronic apparatus 100. Moreover, two distance sensors 182-1 and 182-2 may be provided in the electronic apparatus 100. The two distance sensors 182-1 and 182-2 may be arranged on both sides based on the projector 110. As an example, the two distance sensors 182-1 and 182-2 may be arranged side by side on both sides based on the projector 110.

The processor 170 calculates a pitch angle and a roll angle based on an output value output from the acceleration sensor 181, i.e., a detection result of the acceleration sensor 181. When there is no movement of the electronic apparatus 100 including the acceleration sensor 181, only influence by the acceleration of gravity is measured at each axis of the acceleration sensor, and by using this value, it can be figured out how much an apparatus including the acceleration sensor is tilted with respect to the direction of gravity. An example of the specific operation formula is as follows.

$$\phi = \tan^{-1}\left(\frac{A_{by}}{A_{bz}}\right) \quad \langle \text{Formula 1} \rangle$$

$$\theta = \tan^{-1}\left(\frac{A_{bx}}{\sqrt{A_{by}^2 - A_{bz}^2}}\right)$$

In Formula 1, $A_{bx}$, $A_{by}$, and $A_{bz}$ are respectively the acceleration values of the x, y, and z axes of the acceleration sensor 181.

Figure 3:
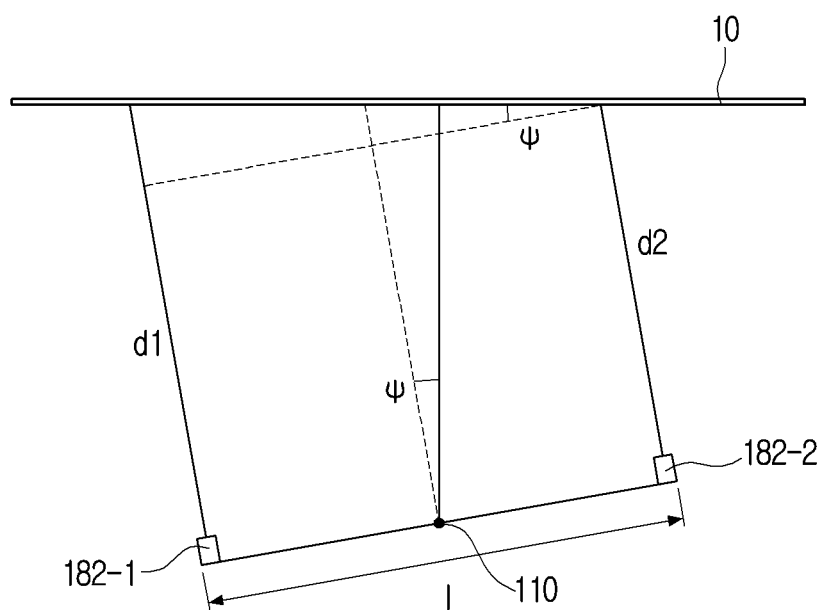
FIG. 3 is a diagram for illustrating a method of calculating warping between a screen and an electronic apparatus by using two distance sensors according to an embodiment of the disclosure.

FIG. 3 is a diagram for illustrating a method of calculating a rotation angle between a screen and an electronic apparatus by using two distance sensors. In a state wherein the two distance sensors 182-1 and 182-2 are arranged side by side on both sides of the electronic apparatus 100 as in FIG. 2, if the electronic apparatus 100 is arranged in a direction warped with respect to the screen 10, the distances d1 and d2 between the two distance sensors 182-1 and 182-2 and the screen 10 become different from each other as in FIG. 3.

If the distance between the two distance sensors 182-1 and 182-2 is 1, the processor 170 calculates the yaw angle ψ based on output values of the plurality of distance sensors 182-1 and 182-2, i.e., detection results from the two distance sensors 182-1 and 182-2, and the distance 1. The specific operation formula is as follows.

$$\psi = \tan^{-1}\left(\frac{d_1 - d_2}{l}\right) \quad \text{(Formula 2)}$$

Figure 4:
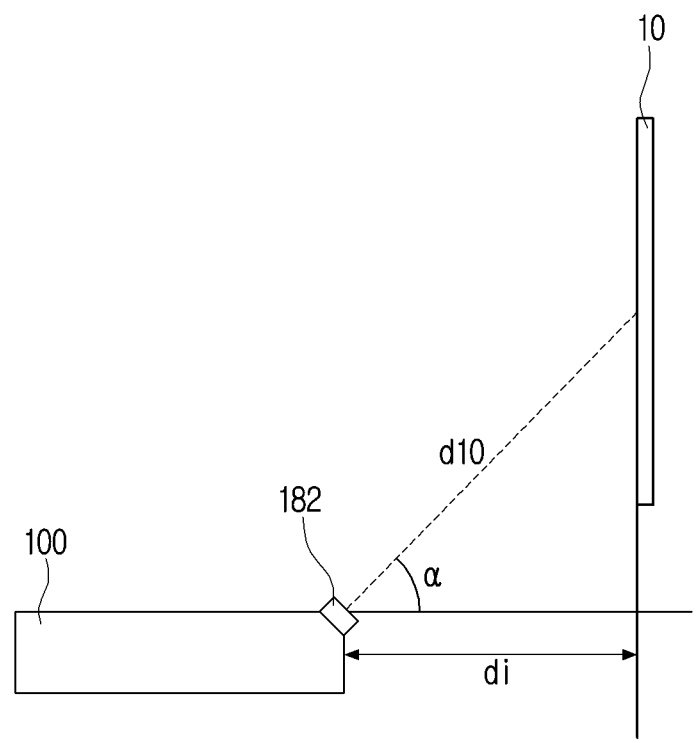
FIG. 4 is a diagram for illustrating another example of using a distance sensor according to an embodiment of the disclosure.

FIG. 3 illustrates a case wherein the two distance sensors are arranged in the front surface direction of the electronic apparatus 100, but the arrangement locations of the distance sensors may vary according to the exterior or the arrangement location of the electronic apparatus 100. In a case wherein the electronic apparatus 100 is arranged on the bottom surface, and the screen 10 is installed in the upper direction from the front side of the electronic apparatus 100 as in FIG. 4, the distance sensor 182 may be arranged in a state of being tilted by a specific angle a. In this case, the processor 170 may obtain the distance to the screen di by using the formula as follows.

$$d_i = d_{i0} \cos(a) \quad \text{<Formula 3>}$$

In Formula 3, i is the number of the distance sensor, and dio is the measurement value of the ith distance sensor. The processor 170 may correct the measurement values of each distance sensor by using Formula 3, and then calculate the rotation angle with the screen 10 by applying the corrected distance values to Formula 2.

The distance 1 between the two distance sensors, or the arrangement angle a, etc. fall under the manufacture specification information of the electronic apparatus 100, and thus they may be obtained in advance and stored in the memory of the electronic apparatus 100, and used in operations.

The processor 170 calculates the pitch angle, the roll angle, and the yaw angle based on detection results of each sensor, as described above, and then performs a keystone correction for an image by using them.

FIG. 5 is a diagram for illustrating a keystone correction method according to an embodiment. If the pitch angle, the roll angle, and the yaw angle were defined as described above, when the tilt of the electronic apparatus 100 is in a normal state, if the processor 170 projects an image by controlling the projector 110, an image without a keystone phenomenon is displayed on the screen 10. Here, a normal state is a case where a rotation angle between the electronic apparatus 100 and the screen, an angle by which the electronic apparatus 100 is tilted, etc. are respectively reference values. In a general case, a reference value may be 0, but a value which is not 0 may be set as the reference value according to the placed location or the state of the surroundings.

In case the electronic apparatus 100 is tilted in the x axis direction and the roll angle became different from the reference value (e.g., 0), an image projected on the screen 10 is displayed in a state of being tilted to the right side 31, or being tilted to the left side 32 according to the tilted direction. The processor 170 rotates the image in the opposite direction to the changed direction of the roll angle, and thereby makes the image in a normal form 30 displayed on the screen.

In case the electronic apparatus 100 is tilted in the y axis direction and the pitch angle became different from the reference value (e.g., 0), an image projected on the screen 10 becomes a trapezoid form 41, 42 according to the tilted direction. In this case, the processor 170 performs a correction of lengthening the upper side, or lengthening the lower side, and thereby makes the image in a normal form 40 displayed on the screen 10.

In case the electronic apparatus 100 is tilted in the z axis direction and the yaw angle became different from the reference value (e.g., 0), an image projected on the screen 10 becomes a trapezoid form of which left side or right side is short 51, 52 according to the tilted direction. In this case, the processor 170 performs a correction of lengthening the left side, or lengthening the right side of the image, and thereby makes the image in a normal form 50 displayed on the screen 10.

Figure 6:
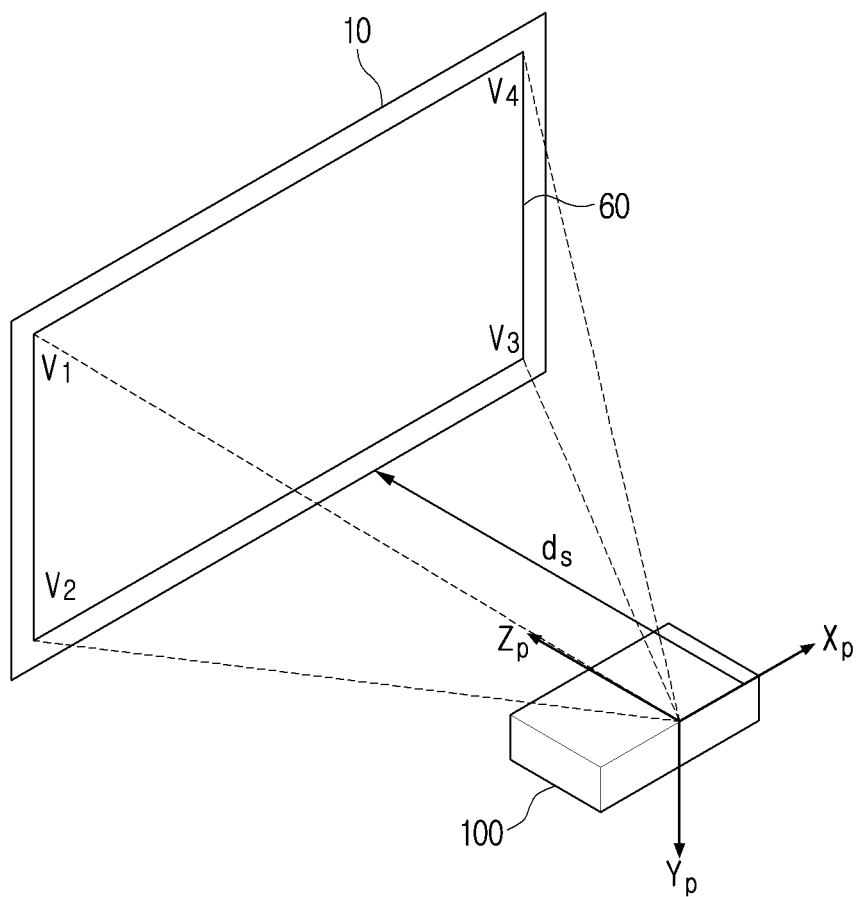
FIG. 6 is a diagram for illustrating in detail a method of performing a keystone correction according to an embodiment of the disclosure.

FIG. 6 is a diagram for illustrating in more detail a method of performing a keystone correction. The electronic apparatus 100 may obtain information necessary for a keystone correction through an initial setting operation, and store the information in advance.

Specifically, in a state wherein the screen 10 and the electronic apparatus 100 are arranged as in FIG. 6, and in a state wherein the rotation angle between the electronic apparatus 100 and the screen is 0, and all of the tilted angles in the direction of gravity are 0 (i.e., all of the roll angle, the pitch angle, and the yaw angle are 0), if an image of a resolution already known is output at the electronic apparatus 100, an image without a keystone phenomenon is displayed on the screen 10. Here, the electronic apparatus 100 measures the distance ds between the center of the projection lens of the projector 110 and the screen, and the three-dimensional coordinates $[V_{ix}, V_{ky}, V_{kz}]^T$ of the four vertexes v1, v2, v3, v4 of the rectangular image 60 projected on the screen 10 centered around the projection lens, etc. in advance, and stores them. In the electronic apparatus 100, the wide angle of the lens projecting a light is restrictive, and thus a size of an image that can be displayed in a maximum size varies according to the distance to the screen. In the initial setting operation, a user can fit the distance such that an image is displayed as big as possible within the screen 10. In such a state wherein the distance was adjusted, if the setting menu, etc. are pushed, the distance information sensed at that time, the coordinate information of the four vertexes of the image displayed at that time, etc. are stored. Here, when an image without a keystone phenomenon is displayed on the screen 10, a range within the coordinates of the four vertexes thereof is referred to as an image display range.

In a method of measuring the distance ds to the screen, the distance may be measured by various methods according to the number and the locations of the distance sensors. For example, in case two distance sensors are arranged on both sides centered around the location of the projection lens, if an average value of the distances measured at the two distance sensors is obtained, the distance ds from the location of the projection lens to the screen can be calculated. The processor 170 may calculate the three-dimensional coordinates of the four vertexes projected on the screen 10 based on the size of the image to be projected and the distance ds. Here, k refers to the number of each vertex. Even if the distance ds is changed after the setting, and the three-dimensional coordinates of the four vertexes of the rectangular image 60 are changed accordingly, the coordinates can be newly obtained through measurement and calculation. The standard of three-dimensional coordinates for expressing four vertexes on the screen is based on the coordinate system $X_p$, $Y_p$, $Z_p$ centered around the projection lens of the electronic apparatus 100, as illustrated in FIG. 6.

As described above, the electronic apparatus 100 may be tilted or placed obliquely based on the screen according to the arranged state, and due to this, at least one of the pitch angle, the roll angle, or the yaw angle may not be 0. The processor 170 obtains a rotation matrix R as follows by using the pitch angle, the roll angle, and the yaw angle calculated by using the aforementioned formulae.

$$R = R_{x,\phi} R_{y,\theta} R_{z,\psi} \qquad \langle \text{Formula 4} \rangle$$

$$R_{x,\phi} = \begin{bmatrix} 1 & 0 & 0 \\ 0 & \cos(\phi) & \sin(\phi) \\ 0 & -\sin(\phi) & \cos(\phi) \end{bmatrix}$$

$$R_{y,\theta} = \begin{bmatrix} \cos(\theta) & 0 & -\sin(\theta) \\ 0 & 1 & 0 \\ \sin(\theta) & 0 & \cos(\theta) \end{bmatrix}$$

$$R_{z,\psi} = \begin{bmatrix} \cos(\psi) & \sin(\psi) & 0 \\ -\sin(\psi) & \cos(\psi) & 0 \\ 0 & 0 & 1 \end{bmatrix}$$

The processor 170 may calculate the distance ds between the center of the projection lens and the projection surface (the screen) measured in a state wherein all of the posture angles (the pitch angle, the roll angle, and the yaw angle) are 0 through conversion using the rotation matrix R.

When the pitch angle, the roll angle, and the yaw angle calculated based on Formulae 1 and 2, the aforementioned distance ds between the center of the lens and the screen, and the three-dimensional coordinates of the four vertexes of the rectangular image before rotation are obtained, the processor 170 may calculate the coordinates of the four vertexes when a keystone occurred by using the following formula.

$$Pk = \begin{bmatrix} Pkx \\ Pky \\ Pkz \end{bmatrix} = \begin{bmatrix} \frac{x_k}{(z_k/d_s)} \\ \frac{y_k}{(z_k/d_s)} \\ d_s \end{bmatrix} \qquad \langle \text{Formula 5} \rangle$$

In Formula 5, pk is the three-dimensional coordinates $[p_{kx}, p_{ky}, p_{kz}]^T$ of the kth vertex when a keystone occurred. In Formula 5, xk, yk, and zk can be calculated by using the following formula.

$$\begin{bmatrix} x_k \\ y_k \\ z_k \end{bmatrix} = R_p v_k = R_p \begin{bmatrix} v_{kx} \\ v_{ky} \\ v_{kz} \end{bmatrix} \qquad \langle \text{Formula 6} \rangle$$

In Formula 6, k is the number of each vertex, and the three-dimensional coordinates $[X_k, Y_k, Z_k]^T$ are coordinates after the three-dimensional coordinates $[p_{kx}, p_{ky}, p_{kz}]^T$ of the kth vertex were rotated by the rotation matrix Rp. Referring to FIG. 6, and Formulae 5 and 6, the distance with respect to the Zp coordinate axis of the four vertexes is always ds, and thus it can be figured out that pkz=ds.

The rotation matrix Rp used in Formula 6 can be defined as follows.

$$R_p = R_{X,\theta} R_{Y,\psi} R_{Z,\phi} \qquad \langle \text{Formula 7} \rangle$$

$$R_{X,\theta} = \begin{bmatrix} 1 & 0 & 0 \\ 0 & \cos(\theta) & \sin(\theta) \\ 0 & -\sin(\theta) & \cos(\theta) \end{bmatrix}$$

$$R_{Y,\psi} = \begin{bmatrix} \cos(-\psi) & 0 & -\sin(-\psi) \\ 0 & 1 & 0 \\ \sin(-\psi) & 0 & \cos(-\psi) \end{bmatrix}$$

$$R_{Z,\phi} = \begin{bmatrix} \cos(-\phi) & \sin(-\phi) & 0 \\ -\sin(-\phi) & \cos(-\phi) & 0 \\ 0 & 0 & 1 \end{bmatrix}$$

In such a state, the relation between the pixel location coordinates $[\mu_{kx}, \mu_{ky}, 1]^T$ of the kth vertex among the four vertexes μ1, μ2, μ3, μ4 of the image to be projected on the screen 10 and the locations of the four vertexes p1, p2, p3, p4 on the screen assumed when a keystone occurred is defined as in the following formula.

$$p_k = P\mu_k = P \begin{bmatrix} \mu_{kx} \\ \mu_{ky} \\ 1 \end{bmatrix} \qquad \langle \text{Formula 8} \rangle$$

In Formula 8, P is a projection matrix. The projection matrix P may be modeled as homography, and its form may be described as follows.

$$P = \begin{bmatrix} a & b & c \\ d & e & f \\ g & h & 1 \end{bmatrix} \qquad \langle \text{Formula 9} \rangle$$

Here, the parameters a, b, c, d, e, f, g, h may be obtained by putting the pixel locations of the four vertexes μ1, μ2, μ3, μ4 of the image to be projected on the screen 10, and the pixel locations of the four vertexes p1, p2, p3, p4 on the screen 10 assumed when a keystone occurred into Formula 8.

According to an embodiment, the processor 170 may perform a keystone correction by converting the locations of each pixel xp, yp of the original image by using the following formula.

$$\begin{bmatrix} x_w \\ y_w \\ 1 \end{bmatrix} = W \begin{bmatrix} x_p \\ y_p \\ 1 \end{bmatrix} = P^{-1} S \begin{bmatrix} x_p \\ y_p \\ 1 \end{bmatrix} \qquad \langle \text{Formula 10} \rangle$$

Figure 11:
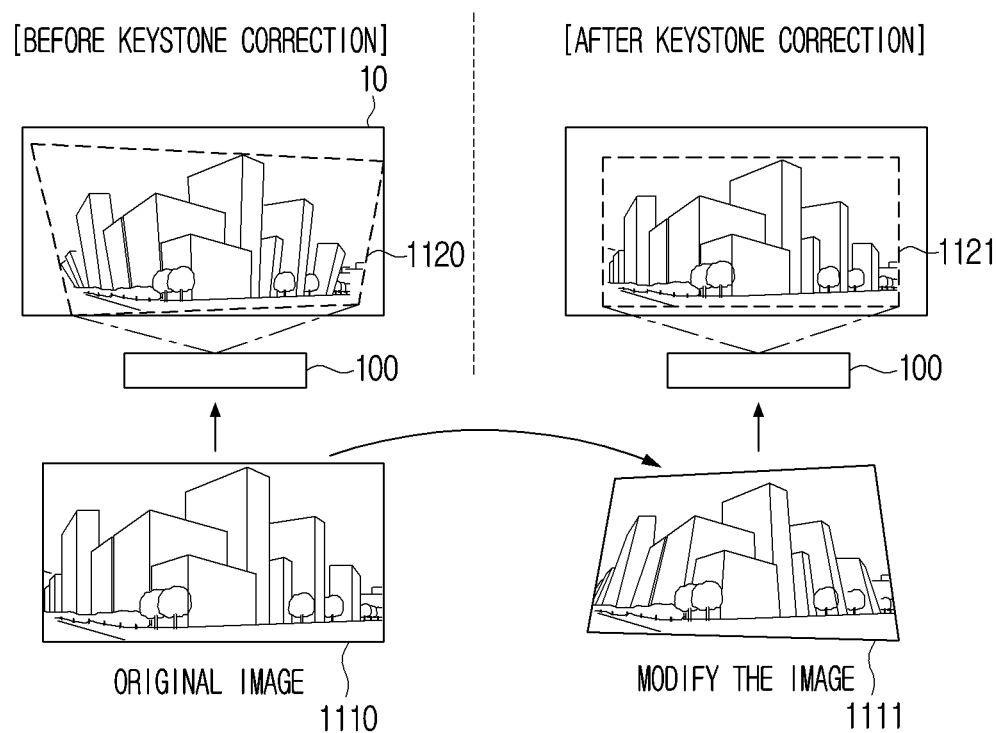
FIG. 11 is a diagram for comparing before and after image processing.

In Formula 10, $P^{-1}$ is an inverse matrix of the projection matrix. Also, S is a matrix consisting of a scale parameter s for changing the size, and parameters tx and ty for moving the location to the x axis direction and the y axis direction. Specifically, S may be indicated as follows.

$$S = \begin{bmatrix} s & 0 & t_x \\ 0 & s & t_y \\ 0 & 0 & 1 \end{bmatrix} \qquad \langle \text{FIG. 11} \rangle$$

The processor 170 sets the scale parameter s such that a rectangle having vertexes located inside the image where the keystone occurred is formed, and the resolution of the image of the original image becomes as big as possible. Also, if a situation wherein a user manipulation for moving the display location of the image is input, or the display location should be moved occurs, the processor 170 may adjust at least one of tx or ty.

Specifically, the processor 170 calculates the four vertexes of the image projected on the screen. If the coordinates of the calculated vertexes extend beyond the coordinates of the four vertexes of the screen 10, the processor 170 adjusts the scale parameter s to be smaller, and thereby makes the image for which the keystone correction was performed not extend beyond the screen 10. The processor 170 sets the scale parameter s such that the image for which the keystone correction was performed can be displayed in a maximum size within the range of not going beyond the screen 10. In the case of an electronic apparatus 100 with an optical zoom function, the coordinates of the four vertexes of the image projected on the screen 10 for which the keystone correction was performed may be obtained by using the magnification information of the distance and the zoom. In this case, the magnification of the zoom may be adjusted such that the four vertexes are optimized for the screen.

Figure 7:
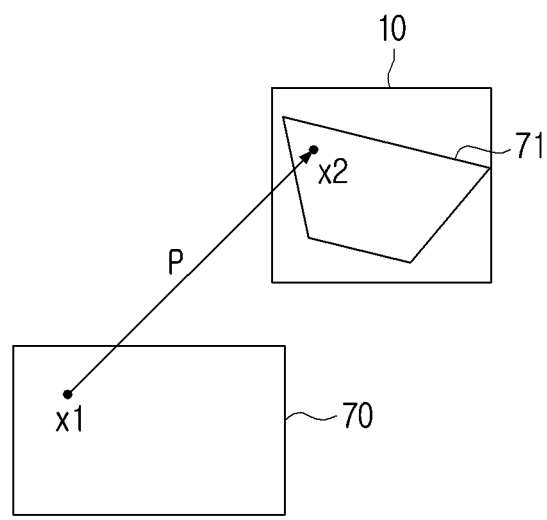
FIG. 7 is a diagram for illustrating a keystone correction according to an embodiment of the disclosure.
Figure 8:
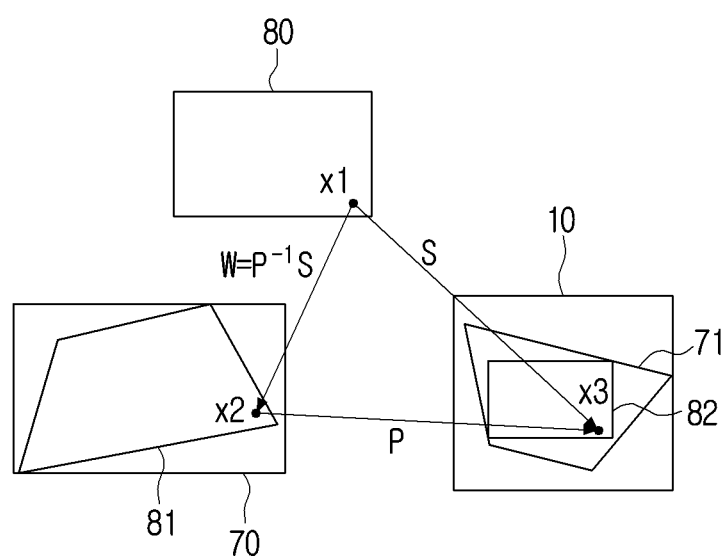
FIG. 8 is a diagram for illustrating image processing according to an embodiment of the disclosure.

FIG. 7 and FIG. 8 are diagrams for illustrating effects according to a keystone correction. Referring to FIG. 7, it can be known that, if an image frame 70 in a rectangular shape is projected from the electronic apparatus 100, an image frame 71 warped by a keystone effect is displayed on the screen 10. Here, the image frame 70 is included in the light projected from the projector 110. The pixel x1 within the image frame 70 is displayed on the location x2 on the screen determined by the projection matrix.

The processor 170 converts the original image 80 into a corrected image 81 as illustrated in FIG. 8 for correcting the keystone effect. The processor 170 controls the projector 110 such that the image frame 70 including the corrected image 81 is projected. Accordingly, even if a keystone effect occurs in the screen 10 and the image frame 70 is warped, the image 82 displayed on the screen becomes a rectangular shape. It can be known that the location of one pixel x1 within the original image 80 is located on the x2 point within the corrected image 81 by the projection matrix P and the scaling matrix S, and is located on the x3 point within the image 82 displayed on the screen 10.

As described above, the processor 170 may compare the coordinates of the four vertexes of the image to be displayed on the screen and the coordinates of the four vertexes of the image displayed on the screen in a normal state (i.e., a state wherein all of the pitch angle, the roll angle, and the yaw angle are fixed to 0 or reference values) at the same distance, and identify whether the image to be actually displayed is within a specific area of the screen. The specific area may be a predetermined area of the screen. If the image projected on the screen exceeds the predetermined area within the screen, the processor 170 may control the size of the image for which the keystone correction was performed, and project the image within the predetermined area. For example, the predetermined area may be an area within the size range of the screen.

If the projected image is located within the predetermined area, the processor 170 sets the scale parameter such that the image becomes a maximum size within the range. In this case, if there is a user manipulation, the processor 170 may reduce the image size by adjusting the scale parameter.

According to an embodiment, information on the distance measured in the normal state, the coordinates of the four vertexes of the image displayed on the screen in the normal state, etc. may be stored in the memory provided in the electronic apparatus 100, or provided from a separate source. Also, the information may be directly input by a user.

Also, if the size information of the actual screen 10 or the information on the coordinates of each vertex of the screen is stored in advance, the processor 170 may adjust the size of the image for which the keystone correction was performed by comparing the size with such information.

According to an embodiment, the keystone correcting operation and the operation of adjusting the size of the image may be processed at once through one calculating operation, or they may be processed sequentially depending on implementation methods. As an example, the operation of adjusting the size of the image may be performed additionally after the keystone correction was performed according to the user's selection.

Figure 9:
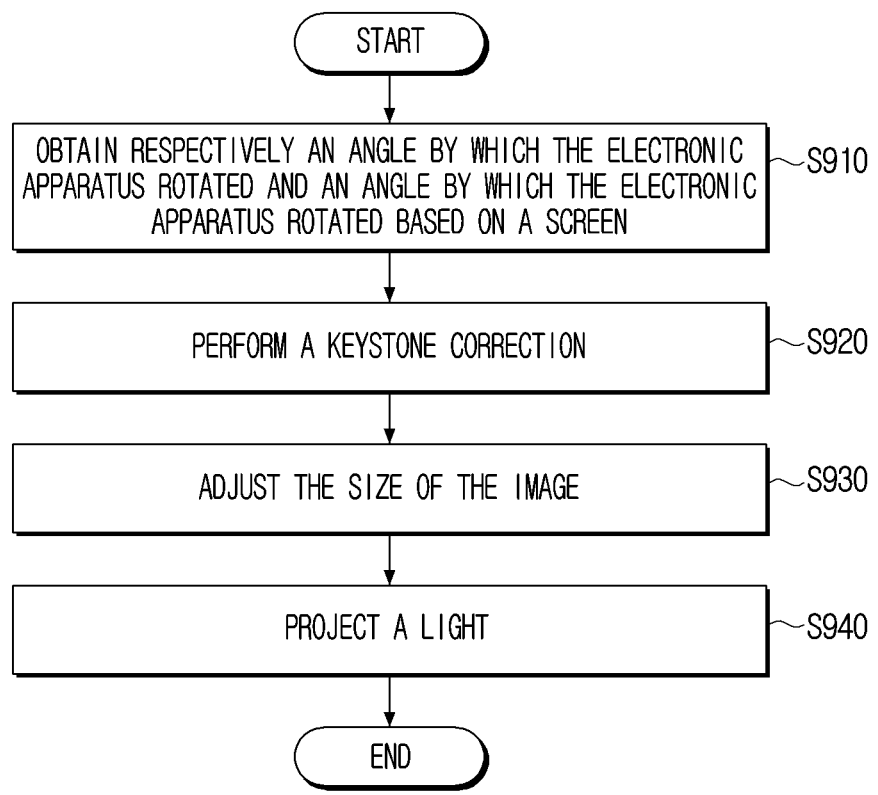
FIG. 9 is a flow chart for illustrating an image processing method according to an embodiment of the disclosure.

FIG. 9 is a flow chart for illustrating an image processing method of an electronic apparatus according to an embodiment of the disclosure. According to FIG. 9, the electronic apparatus obtains the angle by which the electronic apparatus rotated based on the direction of gravity, and the angle by which the image output by the electronic apparatus is rotated based on the screen, etc. in operation S910. Specifically, the electronic apparatus calculates a pitch angle, a roll angle, and a yaw angle, etc. As the method of calculating these angles was described in detail in the aforementioned parts, overlapping explanation will be omitted.

The electronic apparatus performs a keystone correction by using the obtained angles and other preliminary information in operation S920. Specifically, the electronic apparatus assumes the posture of the electronic apparatus by using the calculated angles, and decides respectively the aforementioned rotation matrix, projection matrix, image conversion matrix, scale matrix, etc. by using the information such as the prestored distance to the screen, the coordinates of each vertex of the screen, or the coordinates of each vertex of the image displayed normally within the screen, etc. The electronic apparatus performs the keystone correction by applying the determined matrices to the original image.

Also, the electronic apparatus adjusts the size of the image in operation S930. Specifically, the electronic apparatus obtains the coordinates of each vertex of the image to be displayed on the screen 10 after the keystone correction, and compares the vertex coordinates with the coordinates of each vertex of the screen or the coordinates of each vertex of the image displayed normally within the screen, etc., and determines whether the image will be displayed within the predetermined area of the screen 10. If, as a result of determination, the image exceeds the predetermined area within the screen 10, the electronic apparatus controls the size of the image by adjusting the scale parameter. For example, the electronic apparatus may reduce the size of the image such that the image is displayed within the predetermined area of the screen. In contrast, if the image is smaller than the size that can be displayed maximally, the electronic apparatus adjusts the scale parameter such that the image can be displayed in the maximum size.

When the image processing is completed, the electronic apparatus projects a light including the corrected image to the direction of the screen in operation S940.

In the embodiment illustrated in FIG. 9, the keystone correction and the adjustment of the size of the image are performed sequentially in different operations from each other. However, the disclosure is not limited thereto, and as such, in the case of processing them as the aforementioned operations using formulae, the keystone correction and the adjustment of the size of the image may be performed at once.

In another embodiment of the disclosure, the aforementioned image processing job can be performed in a state wherein the electronic apparatus is fixed.

Figure 10:
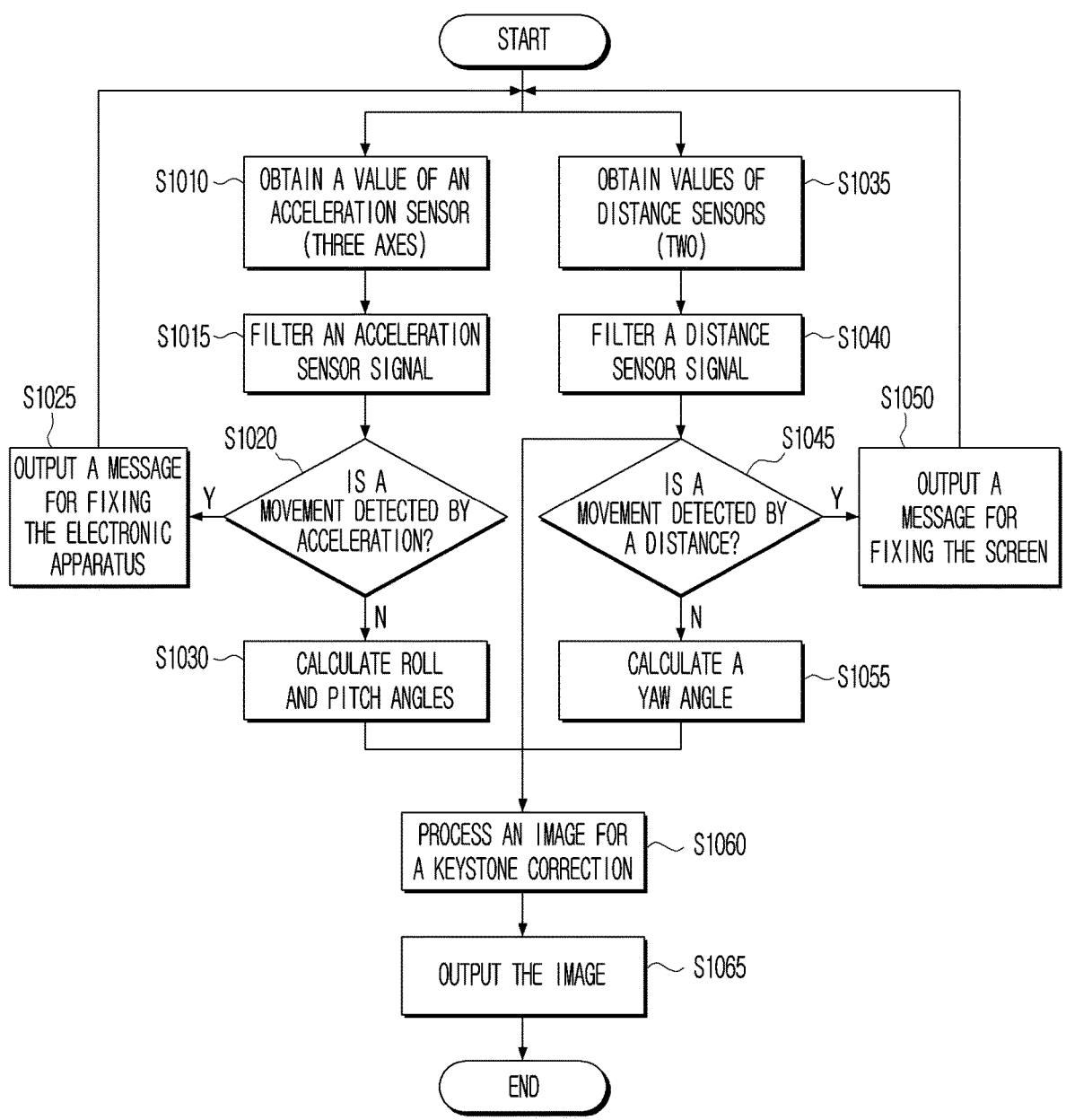
FIG. 10 is a flow chart for illustrating an image processing method according to another embodiment of the disclosure.

FIG. 10 is a flow chart for illustrating an image processing method according to another embodiment of the disclosure.

According to FIG. 10, the electronic apparatus acquires sensor values by using the acceleration sensor and the distance sensors respectively in operations S1010 and S1035. Depending on design methods, acquisition of sensor values may be performed sequentially or in parallel.

If a sensor signal is output from the acceleration sensor, the electronic apparatus performs filtering for removing the noise of the signal in operation S1015. In case the acceleration sensor has three axes, the electronic apparatus reads all of the sensor values of the tri-axis acceleration sensor. Here, reading may be performed after acquiring acceleration sensor values for a specific time, or performed in real time.

The electronic apparatus checks the sensor values of the acceleration sensor a plurality of times. Accordingly, the electronic apparatus determines whether there is a movement by comparing the current measurement value and the previous measurement value. According to an embodiment, normalizing operation may be performed for the difference value by using the following formula.

$$Norm_{acc} = \sqrt{\{A_{bx}(t) - A_{bx}(t-1)\}^2 + \{A_{by}(t) - A_{by}(t-1)\}^2 + \{A_{bz}(t) - A_{bz}(t-1)\}^2}$$ <Formula 12>

Here, $A_{bx}$, $A_{by}$, and $A_{bz}$ are output values of the acceleration sensor having x, y, and z axes respectively, and t is time.

If the normalized difference value exceeds a threshold value, the electronic apparatus determines that there is a movement in operation S1020. Even if the tilt is fixed, a sensor output value may be generated according to the surrounding magnetic field or a change of the environment, and thus the threshold value is not necessarily set as 0, but may be set in consideration of a micro error range. If it is determined that there is a movement, the electronic apparatus outputs a user interface (UI) guiding to fix the electronic apparatus in operation S1025. If the electronic apparatus performing the operation in FIG. 10 includes a projector, the electronic apparatus may control the projector and project a UI on the screen. If the electronic apparatus does not include a projector including a projector, but includes an output device such as a general display or speaker, etc., the electronic apparatus may provide a UI or a message guiding fixation by using such an output means. If a movement of the electronic apparatus is identified, the electronic apparatus may not perform a keystone correction until the movement stops.

If the user who checked the message fixes the electronic apparatus, the electronic apparatus calculates a pitch angle and a roll angle by using the sensor values of the acceleration sensor in operation S1030. As the method of calculating a pitch angle and a roll angle was described above, overlapping explanation will be omitted.

When sensor values are acquired from the plurality of distance sensors in operation S1035, the electronic apparatus performs filtering for removing the noise in operation S1040. The electronic apparatus may perform filtering after acquiring distance values for a specific time, or perform filtering in real time.

After acquiring the sensing values of the distance sensors a plurality of times, the electronic apparatus determines whether there is a movement by comparing the current measurement value and the previous measurement value in operation S1045.

In this case, the electronic apparatus may check the difference between the measurement values by performing normalizing by the method as in the following formula.

$$Norm_{dist} = \sqrt{\{d_1(t) - d_1(t-1)\}^2 + \{d_2(t) - d_2(t-1)\}^2}$$ <Formula 13>

Here, d1 is the sensing value of the first distance sensor, d2 is the sensing value of the second distance sensor, and t is time. If the calculated value exceeds the threshold value, the electronic apparatus determines that there is a movement. The threshold value is not necessarily set as 0, but may be set in consideration of a micro error range.

If it is determined that the sensor values of the distance sensors were changed, the electronic apparatus outputs a UI or a message for fixing the screen or the electronic apparatus in operation S1050. As described above, the UI may be projected on the screen, or displayed on the display provided in the electronic apparatus itself, or output as a message such as a voice, etc. through the speaker.

If it is determined that the state is a fixed state wherein there is no movement, the electronic apparatus calculates the yaw angle in operation S1055. As the method of calculating the yaw angle was described above, overlapping explanation will be omitted.

When all of the pitch angle, the roll angle, and the yaw angle are calculated as described above, the electronic apparatus performs an image processing operation for a keystone correction and scale adjustment in operation S1060.

Specifically, the electronic apparatus obtains a projection matrix P indicating a relation between points on a virtual plane without warping and points on the actual screen, and pre-warps the image to be projected on the screen by using the obtained projection matrix, and obtains an image conversion matrix that makes an image in a form as rectangular as possible output on the screen. Here, the image conversion matrix is set such that loss of the resolution is minimized, and the image becomes as maximum as possible within the size range of the screen. As the image processing method using these matrices was described in detail in the aforementioned parts, overlapping explanation will be omitted.

The electronic apparatus outputs the processed image in the direction of the screen in operation S1065.

As described above, according to the various embodiments of the disclosure, a keystone correction can be performed without using an image sensor, and thus a complex image processing process is omitted, and hardware can be reduced.

FIG. 11 is a diagram for illustrating a keystone effect of an electronic apparatus according to an embodiment of the disclosure.

According to FIG. 11, in case the original image 1110 is output as it is, a warped image 1120 is displayed on the screen 10. The electronic apparatus 100 modifies the original image before projection, and generates and outputs a corrected image 1111. Accordingly, an image that is not warped 1121 is displayed on the screen 10. The size of the image that is not warped 1121 is displayed in a maximum size within the actual expressible range, and in case the image goes beyond the size of the screen 10, the image is displayed in a reduced size to fit the size of the screen 10. Accordingly, a user can view an image in a normal state in a possible maximum size and a possible maximum resolution in the current state without a separate manipulation.

The image processing method described in FIG. 9 and FIG. 10 can be performed in an electronic apparatus having the configuration as in FIG. 1, but the disclosure is not necessarily limited thereto, and the image processing method can be performed in electronic apparatuses having various configurations. Also, in FIG. 2, it was illustrated that the main body of the electronic apparatus 100 is a rectangle, but the exterior of the electronic apparatus 100 can also be implemented in various forms. Hereinafter, the exterior and the configuration of the electronic apparatus 100 modified in various forms will be described.

Figure 12:
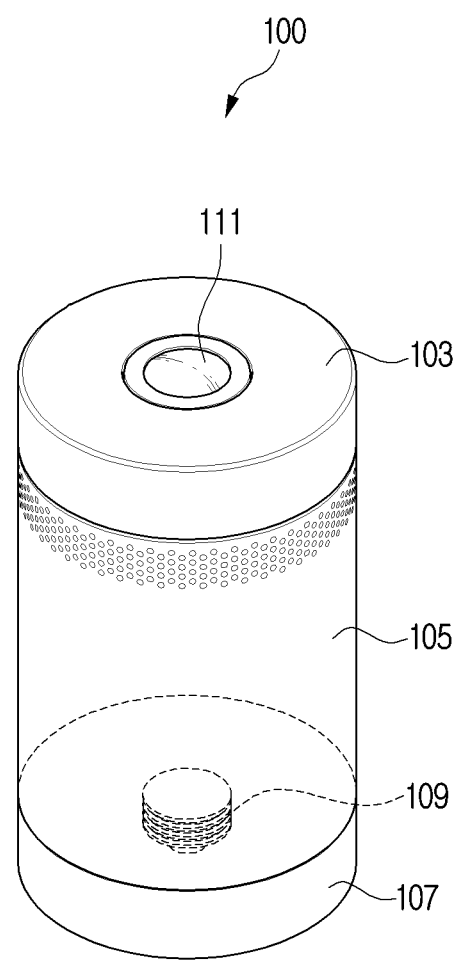
FIG. 12 is a perspective view illustrating an exterior of an electronic apparatus according to an embodiment of the disclosure.

FIG. 12 is a perspective view illustrating the exterior of the electronic apparatus 100 according to an embodiment of the disclosure.

Referring to FIG. 12, the electronic apparatus 100 may include a head 103, a main body 105, a projection lens 111, a connector 109, or a cover 107.

The electronic apparatus 100 may be apparatuses in various forms. In particular, the electronic apparatus 100 may be a projector apparatus that enlarges and projects an image on a wall or a screen, and the projector apparatus may be an LCD projector or a digital light processing (DLP) type projector using a digital micromirror device (DMD).

Also, the electronic apparatus 100 may be a display apparatus for a household use or an industrial use. Alternatively, the electronic apparatus 100 may be a lighting apparatus used in everyday lives, or an acoustic apparatus including an acoustic module, and it may also be implemented as a portable communication apparatus (e.g.: a smartphone), a computer apparatus, a portable multimedia apparatus, a wearable apparatus, or a home appliance, etc. The electronic apparatus 100 according to an embodiment of the disclosure is not limited to the aforementioned apparatuses, and the electronic apparatus 100 may be implemented as an electronic apparatus 100 equipped with two or more functions of the aforementioned apparatuses. For example, in the electronic apparatus 100, a projector function may be turned off and a lighting function or a speaker function may be turned on according to a manipulation of the processor, and the electronic apparatus 100 may be utilized as a display apparatus, a lighting apparatus, or an acoustic apparatus, and it may include a microphone or a communication device, and may be utilized as an artificial intelligence (AI) speaker.

The main body 105 is a housing forming the exterior, and it may support or protect the component parts (e.g., the components illustrated in FIG. 13) of the electronic apparatus 100 arranged inside the main body 105. The shape of the main body 105 may have a structure close to a cylindrical form as illustrated in FIG. 12. However, the shape of the main body 105 is not limited thereto, and according to the various embodiments of the disclosure, the main body 105 may be implemented as various geometrical shapes such as a column having polygonal cross sections, a cone, and a sphere.

The size of the main body 105 may be a size that a user can grip or move by one hand, and the main body 105 may be implemented as a subminiature form so as to be easily carried, and it may be implemented as a size that can be held on a table or coupled to a lighting apparatus.

The material of the main body 105 may be implemented as matt metal or a synthetic resin so that it is not smeared with a user's fingerprint or dust. Alternatively, the exterior of the main body 105 may consist of a sleek glossy surface.

In the main body 105, a friction area may be formed in some areas of the exterior of the main body 105 so that a user can grip and move the main body 105 with ease and without slippage. Alternatively, in at least some areas of the main body 105, a bent gripping part or a support 108a (refer to FIG. 14) that a user can grip may be provided.

The projection lens 111 is formed on one surface of the main body 105, and is formed to project a light that passed through the lens array to the outside of the main body 105. The projection lens 111 according to the various embodiments may be a low dispersion-coated optical lens for reducing chromatic aberration. Also, the projection lens 111 may be a convex lens or a condensing lens, and the projection lens 111 according to an embodiment may adjust the focus by adjusting locations of a plurality of sub lenses.

The head 103 may be coupled to one surface of the main body 105, and the head 103 may support and protect the projection lens 111. The head 103 may be coupled with the main body 105 so as to be swiveled within a predetermined angle range based on one surface of the main body 105.

The head 103 may be automatically or manually swiveled by a user or the processor, and freely adjust the projection angle of the projection lens 111. Alternatively, according to another embodiment, the head 103 may include a neck that is coupled with the main body 105 and extends from the main body 105, and the head 103 may adjust the projection angle of the projection lens 111 by being tipped or tilted.

The electronic apparatus 100 may project a light or an image to a desired location by adjusting the emission angle of the projection lens 111 while adjusting the direction of the head 103 in a state wherein the location and the angle of the main body 105 are fixed. Also, the head 103 may include a handle that a user can grip after rotating in a desired direction.

According to an embodiment, a plurality of openings may be formed on the outer circumferential surface of the main body 105. Through the plurality of openings, audio output from the audio outputter may be output to the outside of the main body 105 of the electronic apparatus 100. The audio outputter may include a speaker, and the speaker may be used for general uses such as reproduction of multimedia or reproduction of recording, output of a voice, etc.

According to an embodiment of the disclosure, a radiation fan may be provided inside the main body 105, and when the radiation fan is driven, air or heat inside the main body 105 may be discharged through the plurality of openings. Thus, the electronic apparatus 100 may discharge heat generated by the driving of the electronic apparatus 100 to the outside, and prevent the electronic apparatus 100 from being overheated.

The connector 109 may connect the electronic apparatus 100 with an external apparatus and transmit and receive electronic signals, or receive power from the outside. The connector 109 according to an embodiment of the disclosure may be physically connected with an external apparatus. Here, the connector 109 may include an input/output interface, and connect communication with an external apparatus via wire or wirelessly, or receive power. For example, the connector 109 may include an HDMI connection terminal, a USB connection terminal, an SD card accommodation groove, an audio connection terminal, or a power consent. Alternatively, the connector 109 may include a Bluetooth, Wi-Fi or wireless charging connection module that is wirelessly connected with an external apparatus.

Also, the connector 109 may have a socket structure connected with an external lighting apparatus, and may be connected to a socket accommodation groove of the external lighting apparatus and receive power. The size and the specification of the connector 109 in a socket structure may be implemented variously in consideration of an accommodation structure of an external apparatus that can be coupled. For example, according to the international standard E26, the diameter of the joint portion of the connector 109 may be implemented as 26 mm. In this case, the electronic apparatus 100 may be coupled to an external lighting apparatus like a stand in place of a light bulb that is generally used. The electronic apparatus 100 has a structure that is projected up and down when fastened to a conventional socket located on a ceiling, and in case the electronic apparatus 100 does not rotate by socket coupling, the screen cannot rotate, either. Accordingly, even in case the electronic apparatus 100 is socket-coupled and receives power, in order for the electronic apparatus 100 to rotate, the head 103 may adjust the emission angle by being swiveled on one surface of the main body 105 while the electronic apparatus 100 is socket-coupled to a stand on the ceiling, and accordingly, the screen may be output to a desired location, or the screen may be rotated.

The connector 109 may include a coupling sensor, and the coupling sensor may sense whether the connector 109 and an external apparatus are coupled, a coupled state, or a subject for coupling, and transmit the result to the processor, and the processor may control the driving of the electronic apparatus 100 based on the transmitted sensing values.

The cover 107 may be coupled to and separated from the main body 105, and protect the connector 109 so that the connector 109 is not exposed to the outside at all times. The shape of the cover 107 may have a form that is continued with the main body 105 as illustrated in FIG. 1, or the shape may be implemented to correspond to the shape of the connector 109. The cover 107 may support the electronic apparatus 100, and the electronic apparatus 100 may be used as it is coupled to the cover 107 and coupled to or held on an external holder.

According to an embodiment, a battery may be provided inside the cover 107 of the electronic apparatus 100. The battery may include, for example, a primary battery that cannot be recharged, a secondary battery that can be recharged, or a fuel cell.

According to an embodiment, the electronic apparatus 100 may include a camera module, and the camera module may photograph a still image or a moving image. According to an embodiment, the camera module may include one or more lenses, an image sensor, an image signal processor, or a flash.

Also, according to an embodiment, the electronic apparatus 100 may include a protection case so that the electronic apparatus 100 can be easily carried while being protected. Alternatively, the electronic apparatus 100 may include a stand supporting or fixing the main body 105, and a bracket that can be coupled to a wall surface or a partition.

Further, the electronic apparatus 100 may be connected with various external apparatuses by using a socket structure, and provide various functions. As an example, the electronic apparatus 100 may be connected with an external camera apparatus by using a socket structure. The electronic apparatus 100 may provide an image stored in the connected camera apparatus or an image that is currently being photographed by using the projector 110. As another example, the electronic apparatus 100 may be connected with a battery module by using a socket structure, and receive power. Tthe electronic apparatus 100 may be connected with an external apparatus by using a socket structure, but this is merely an example, and the electronic apparatus 100 may be connected with an external apparatus by using a different interface (e.g., a USB, etc.).

Figure 13:
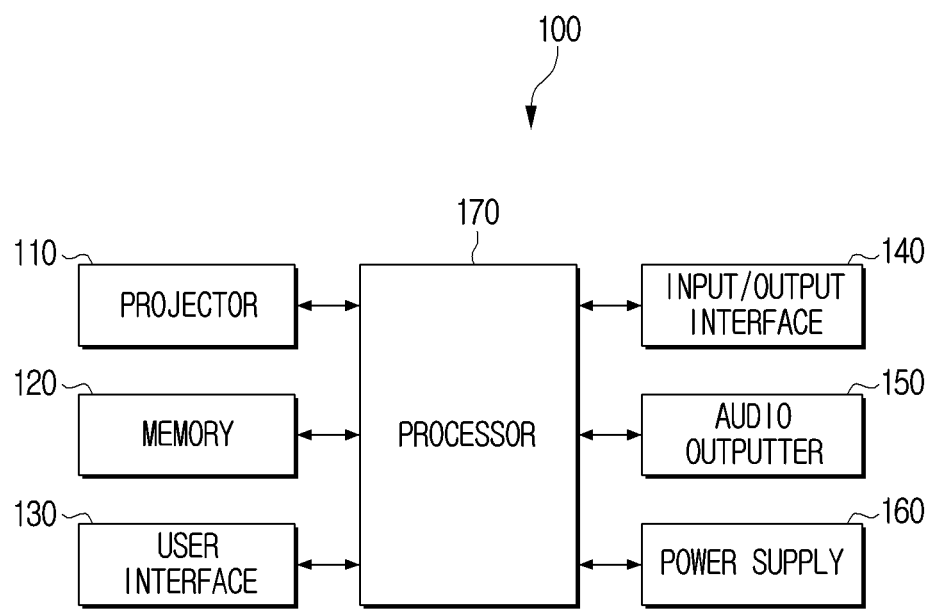
FIG. 13 is a block diagram illustrating a configuration of an electronic apparatus according to an embodiment of the disclosure.

FIG. 13 is a block diagram illustrating a configuration of an electronic apparatus according to an embodiment of the disclosure.

Referring to FIG. 13, the electronic apparatus 100 may include a projector 110, a memory 120, a user interface 130, an input/output interface 140, an audio outputter 150, a power supply 160, and a processor 170. The components illustrated in FIG. 13 are merely examples, and some components may be omitted, and new components may be added.

The projector 110 is a component projecting an image to the outside. The projector 110 according to an embodiment of the disclosure may be implemented by various projection methods (e.g., a cathode-ray tube (CRT) method, a liquid crystal display (LCD) method, a digital light processing (DLP) method, a laser method, etc.). As an example, the CRT method has basically the same principle as a CRT monitor. In the CRT method, an image is enlarged to a lens in front of a cathode-ray tube (CRT), and the image is displayed on a screen. According to the number of cathode-ray tubes, the CRT method is divided into an one-tube method and a three-tube method, and in the case of the three-tube method, the method may be implemented while cathode-ray tubes of red, green, and blue colors are separated from one another.

As another example, the LCD method is a method of displaying an image by making a light output from a light source pass through a liquid crystal display. The LCD method is divided into a single-plate method and a three-plate method, and in the case of the three-plate method, a light output from a light source may be divided into red, green, and blue colors in a dichroic mirror (a mirror that reflects only lights of specific colors, and makes the rest pass through), and pass through a liquid crystal display, and then the lights may be gathered in one place.

As still another example, the DLP method is a method of displaying an image by using a digital micromirror device (DMD) chip. A projector by the DLP method may include a light source, a color wheel, a DMD chip, a projection lens, etc. A light output from the light source may show a color as it passes through the rotating color wheel. The light that passed through the color wheel is input into the DMD chip. The DMD chip includes numerous micromirrors, and reflects the light input into the DMD chip. The projection lens may perform a role of enlarging the light reflected from the DMD chip to an image size.

As still another example, the laser method includes a diode pumped solid state (DPSS) laser and a galvanometer. For a laser outputting various colors, a laser wherein three DPSS lasers are installed for each of RGB colors, and then optical axes are overlapped by using a specific mirror is used. The galvanometer includes a mirror and a motor of a high output, and moves the mirror at a fast speed. For example, the galvanometer may rotate the mirror at 40 KHz/see at the maximum. The galvanometer is mounted according to a scanning direction, and as a projector generally performs planar scanning, the galvanometer may also be arranged while being divided into x and y axes.

The projector 110 may include light sources of various types. For example, the projector 110 may include at least one light source among a lamp, an LED, and a laser.

The projector 110 may output images in a 4:3 screen ratio, a 5:4 screen ratio, and a 16:9 wide screen ratio according to the use of the electronic apparatus 100 or the user's setting, etc. Also, the projector 110 may output images in various resolutions such as WVGA (854*480), SVGA (800*600), XGA (1024*768), WXGA (1180*720), WXGA (1180*800), SXGA (1180*1024), UXGA (1600*1100), Full HD (1920*1080), etc. according to screen ratios.

The projector 110 may perform various functions for adjusting an output image by a control of the processor 170. For example, the projector 110 may perform functions such as zoom, keystone, quick corner (4 corner) keystone, lens shift, etc.

Specifically, the projector 110 may enlarge or reduce an image according to a distance from the screen (a projection distance). That is, a zoom function may be performed according to a distance from the screen. Here, the zoom function may include a hardware method of adjusting the size of the screen by moving the lens, and a software method of adjusting the size of the screen by cropping an image, etc. When the zoom function is performed, adjustment of the focus of an image is needed. For example, methods of adjusting a focus includes a manual focus method, an electric method, etc. The manual focus method means a method of adjusting a focus manually, and the electric method means a method of automatically adjusting a focus by using a motor wherein a projector is included when the zoom function is performed. When performing the zoom function, the projector 110 may provide a digital zoom function through software, and provide an optical zoom function of performing the zoom function by moving the lens through the driving part.

Also, the projector 110 may perform a keystone function. If the height is not right in a front side projection, the screen may get warped in up or down directions. The keystone function means a function of correcting the warped screen. For example, if warping occurs in a left-right direction of the screen, the screen may be corrected by using a horizontal keystone, and if warping occurs in an up-down direction, the screen may be corrected by using a vertical keystone. The quick corner (4 corner) keystone function is a function of correcting the screen in case the central area of the screen is normal but the balance of the corner areas is not right. The lens shift function is a function of moving the screen as it is in case the screen goes beyond the screen.

The projector 110 may automatically analyze the surrounding environment and the projection environment without a user input, and provide zoom/keystone/focus functions. Specifically, the projector 110 may automatically provide the zoom/keystone/focus functions based on a distance between the electronic apparatus 100 and the screen detected through sensors (a depth camera, a distance sensor, an infrared sensor, an illumination sensor, etc.), information on the space wherein the electronic apparatus 100 is currently located, information on the light amount of the surroundings, etc.

Also, the projector 110 may provide a lighting function by using a light source. In particular, the projector 110 may provide a lighting function by outputting a light source by using an LED. According to an embodiment, the projector 110 may include one LED, and according to another embodiment, the electronic apparatus may include a plurality of LEDs. The projector 110 may output a light source by using a surface-emitting LED depending on implementation examples. Here, the surface-emitting LED may mean an LED having a structure wherein an optical sheet is arranged on the upper side of the LED such that a light source is output while being evenly dispersed. Specifically, if a light source is output through the LED, the light source may be evenly dispersed via the optical sheet, and the light source dispersed via the optical sheet may be introduced into a display panel.

The projector 110 may provide a dimming function for adjusting the strength of a light source to a user. Specifically, if a user input for adjusting the strength of a light source is received from a user through the user interface 130 (e.g., a touch display button or a dial), the projector 110 may control the LED to output the strength of the light source corresponding to the received user input.

Also, the projector 110 may provide the dimming function based on a content analyzed by the processor 170 without a user input. Specifically, the projector 110 may control the LED to output the strength of a light source based on information on a content that is currently provided (e.g., the type of the content, the brightness of the content, etc.).

The projector 110 may control the color temperature by a control of the processor 170. Here, the processor 170 may control the color temperature based on a content. Specifically, if a content is identified to be output, the processor 170 may obtain color information for each frame of the content determined to be output. Then, the processor 170 may control the color temperature based on the obtained color information for each frame. Here, the processor 170 may obtain at least one main color of the frame based on the color information for each frame. Then, the processor 170 may adjust the color temperature based on the obtained at least one main color. For example, the color temperature that can be adjusted by the processor 170 may be divided into a warm type or a cold type. Here, it is assumed that the frame to be output (referred to as an output frame hereinafter) includes a scene wherein a fire broke out. The processor 170 may identify (or obtain) that the main color is a red color based on the color information included in the current output frame. Then, the processor 170 may identify the color temperature corresponding to the identified main color (the red color). Here, the color temperature corresponding to the red color may be the warm type. The processor 170 may use an artificial intelligence model to obtain the color information or the main color of the frame. According to an embodiment, the artificial intelligence model may be stored in the electronic apparatus 100 (e.g., the memory 120). According to another embodiment, the artificial intelligence model may be stored in an external server that can communicate with the electronic apparatus 100.

The electronic apparatus 100 may control the lighting function by being interlocked with an external apparatus. Specifically, the electronic apparatus 100 may receive lighting information from an external apparatus. Here, the lighting information may include at least one of brightness information or color temperature information set in the external apparatus. Here, the external apparatus may mean an apparatus connected to the same network as the electronic apparatus 100 (e.g., an IoT apparatus included in the same home/company network), or an apparatus that can communicate with the electronic apparatus even though it is not connected to the same network as the electronic apparatus 100 (e.g., a remote control server). For example, it is assumed that an external lighting apparatus (IoT apparatus) included in the same network as the electronic apparatus 100 is outputting a red lighting at the brightness of 50. The external lighting apparatus (IoT apparatus) may directly or indirectly transmit lighting information (e.g., information indicating that the red lighting is being output at the brightness of 50) to the electronic apparatus 100. Here, the electronic apparatus 100 may control an output of a light source based on the lighting information received from the external lighting apparatus. For example, if the lighting information received from the external lighting apparatus includes information that the red lighting is output at the brightness of 50, the electronic apparatus 100 may output the red lighting at the brightness of 50.

The electronic apparatus 100 may control the lighting information based on biometric information. Specifically, the processor 170 may obtain biometric information of a user. Here, the biometric information may include at least one of the body temperature of the user, the cardiac rate, the blood pressure, the respiration, or the electrocardiogram. Here, the biometric information may include various information other than the aforementioned information. As an example, the electronic apparatus may include a sensor for measuring biometric information. The processor 170 may obtain biometric information of a user through a sensor, and control an output of a light source based on the obtained biometric information. As another example, the processor 170 may receive biometric information from an external apparatus through the input/output interface 140. Here, the external apparatus may mean a portable communication apparatus (e.g., a smartphone or a wearable device) of a user. The processor 170 may obtain the biometric information of the user from the external apparatus, and control an output of a light source based on the obtained biometric information. Depending on implementation examples, the electronic apparatus may identify whether a user is sleeping, and if it is identified that the user is sleeping (or preparing to sleep), the processor 170 may control the output of the light source based on the biometric information of the user.

In the memory 120, at least one instruction related to the electronic apparatus 100 may be stored. Also, in the memory 120, an operating system (O/S) for driving the electronic apparatus 100 may be stored. In addition, in the memory 120, various kinds of software programs or applications for the electronic apparatus 100 to operate according to the various embodiments of the disclosure may be stored. Further, in the memory 120, a semiconductor memory such as a flash memory or a magnetic storage medium such as a hard disk may be included.

Specifically, in the memory 120, various kinds of software modules for the electronic apparatus 100 to operate according to the various embodiments of the disclosure may be stored, and the processor 170 may control the operation of the electronic apparatus 100 by executing the various kinds of software modules stored in the memory 120. That is, the memory 120 may be accessed by the processor 170, and reading/recording/correcting/deleting/updating, etc. of data by the processor 170 may be performed.

According to embodiments of the disclosure, the memory 120 may include a ROM and a RAM inside the processor 170, or a memory card (e.g., a micro SD card, a memory stick) installed on the electronic apparatus 100.

The user interface 130 may include input devices in various types. For example, the user interface 130 may include a physical button. Here, the physical button may include function keys, direction keys (e.g., four-direction keys), or a dial button. According to an embodiment, the physical button may be implemented as a plurality of keys. According to another embodiment, the physical button may be implemented as one key. Here, in case the physical button is implemented as one key, the electronic apparatus 100 may receive a user input that the one key is pushed during a threshold time or longer. If a user input that the one key is pushed during the threshold time or longer is received, the processor 170 may perform a function corresponding to the user input. For example, the processor 170 may provide the lighting function based on the user input.

Also, the user interface 130 may receive a user input by using a non-contact-type method. In the case of receiving a user input through a contact-type method, physical force should be transmitted to the electronic apparatus. Accordingly, a method for controlling the electronic apparatus regardless of physical force may be needed. Specifically, the user interface 130 may receive a user gesture, and perform an operation corresponding to the received user gesture. Here, the user interface 130 may receive a user's gesture through a sensor (e.g., an image sensor or an infrared sensor).

In addition, the user interface 130 may receive a user input by using a touch method. For example, the user interface 130 may receive a user input through a touch sensor. According to an embodiment, the touch method may be implemented as a non-contact-type method. For example, the touch sensor may determine whether a user's body approached within a threshold distance. Here, the touch sensor may identify a user input in case the user does not contact the touch sensor. Depending on a different implementation example, the touch sensor may identify a user input wherein the user contacts the touch sensor.

The electronic apparatus 100 may receive a user input by various methods other than the aforementioned user interface. As an example, the electronic apparatus 100 may receive a user input through an external remote control apparatus. Here, the external remote control apparatus may be a remote control apparatus corresponding to the electronic apparatus 100 (e.g., a control apparatus dedicated to the electronic apparatus), or a portable communication apparatus (e.g., a smartphone or a wearable device) of a user. Here, in a portable communication apparatus of a user, an application for controlling the electronic apparatus may be stored. The portable communication apparatus may obtain a user input through the stored application, and transmit the obtained user input to the electronic apparatus 100. The electronic apparatus 100 may receive the user input from the portable communication apparatus, and perform an operation corresponding to the control command of the user.

The electronic apparatus 100 may receive a user input by using voice recognition. According to an embodiment, the electronic apparatus 100 may receive a user voice through a microphone included in the electronic apparatus. According to another embodiment, the electronic apparatus 100 may receive a user voice from a microphone or an external apparatus. Specifically, the external apparatus may obtain a user voice through a microphone of the external apparatus, and transmit the obtained user voice to the electronic apparatus 100. The user voice transmitted from the external apparatus may be audio data or digital data converted from audio data (e.g., audio data converted into a frequency domain, etc.). Here, the electronic apparatus 100 may perform an operation corresponding to the received user voice. Specifically, the electronic apparatus 100 may receive audio data corresponding to the user voice through the microphone. Then, the electronic apparatus 100 may convert the received audio data into digital data. Then, the electronic apparatus 100 may convert the converted digital data into text data by using a speech to text (STT) function. According to an embodiment, the speech to text (STT) function may be directly performed in the electronic apparatus 100.

According to another embodiment, the speech to text (STT) function may be performed in an external server. The electronic apparatus 100 may transmit digital data to an external server. The external server may convert the digital data into text data, and obtain control command data based on the converted text data. The external server may transmit the control command data (here, text data may also be included) to the electronic apparatus 100. The electronic apparatus 100 may perform an operation corresponding to the user voice based on the obtained control command data.

The electronic apparatus 100 may provide the voice recognition function by using one assistance (or an artificial intelligence agent, e.g., Bixby™, etc.), but this is merely an example, and the electronic apparatus 100 may provide the voice recognition function through a plurality of assistances. Here, the electronic apparatus 100 may provide the voice recognition function by selecting one of the plurality of assistances based on a trigger word corresponding to the assistance or a specific key that exists on the remote control.

The electronic apparatus 100 may receive a user input by using a screen interaction. The screen interaction may mean a function of identifying whether a predetermined event occurs through an image that the electronic apparatus projected on the screen (or the projection surface), and obtaining a user input based on the predetermined event. Here, the predetermined event may mean an event wherein a predetermined object is identified in a specific location (e.g., a location wherein a UI for receiving a user input is projected). Here, the predetermined object may include at least one of a part of a user's body (e.g., a finger), a pointer, or a laser point. If the predetermined object is identified in the location corresponding to the projected UI, the electronic apparatus 100 may identify that a user input selecting the projected UI was received. For example, the electronic apparatus 100 may project a guide image such that a UI is displayed on the screen. Then, the electronic apparatus 100 may identify whether the user selects the projected UI. Specifically, if the predetermined event is identified in the location of the projected UI, the electronic apparatus 100 may identify that the user selected the projected UI. Here, the projected UI may include at least one item. Here, the electronic apparatus 100 may perform spatial analysis for identifying whether the predetermined event is in the location of the projected UI. Here, the electronic apparatus 100 may perform spatial analysis through a sensor (e.g., an image sensor, an infrared sensor, a depth camera, a distance sensor, etc.). By performing spatial analysis, the electronic apparatus 100 may identify whether the predetermined event occurs in the specific location (the location wherein the UI is projected). Then, if it is identified that the predetermined event occurs in the specific location (the location wherein the UI is projected), the electronic apparatus 100 may identify that a user input for selecting the UI corresponding to the specific location was received.

The input/output interface 140 is a component for inputting or outputting at least one of an audio signal or an image signal. The input/output interface 140 may receive input of at least one of an audio signal or an image signal from an external apparatus, and output a control command to the external apparatus.

The input/output interface 140 according to an embodiment of the disclosure may be implemented as a wired input/output interface of at least one of a High Definition Multimedia Interface (HDMI), a Mobile High-Definition Link (MHL), a Universal Serial Bus (USB), a USB C-type, a Display Port (DP), Thunderbolt, a Video Graphics Array (VGA) port, an RGB port, a D-subminiature (D-SUB), or a Digital Visual Interface (DVI). According to an embodiment, the wired input/output interface may be implemented as an interface inputting or outputting only audio signals and an interface inputting or outputting only image signals, or implemented as one interface inputting or outputting both of audio signals and image signals.

Also, the electronic apparatus 100 may receive data through the wired input/output interface, but this is merely an example, and the electronic apparatus 100 may receive power through the wired input/output interface. For example, the electronic apparatus 100 may receive power from an external battery through a USB C-type, or receive power from a consent through a power adaptor. As another example, the electronic apparatus may receive power from an external apparatus (e.g., a laptop computer or a monitor, etc.) through a DP.

The input/output interface 140 according to an embodiment of the disclosure may be implemented as a wireless input/output interface that performs communication by at least one communication method among communication methods of Wi-Fi, Wi-Fi Direct, Bluetooth, Zigbee, 3rd Generation (3G), 3rd Generation Partnership Project (3GPP), and Long Term Evolution (LTE). Depending on implementation examples, the wireless input/output interface may be implemented as an interface inputting or outputting only audio signals and an interface inputting or outputting only image signals, or implemented as one interface inputting or outputting both of audio signals and image signals.

Also, implementation may be made such that an audio signal is input through a wired input/output interface, and an image signal is input through a wireless input/output interface. Alternatively, implementation may be made such that an audio signal is input through a wireless input/output interface, and an image signal is input through a wired input/output interface.

The audio outputter 150 is a component outputting audio signals. In particular, the audio outputter 150 may include an audio output mixer, an audio signal processor, and an acoustic output module. The audio output mixer may synthesize a plurality of audio signals to be output into at least one audio signal. For example, the audio output mixer may synthesize an analog audio signal and another analog audio signal (e.g.: an analog audio signal received from the outside) into at least one analog audio signal. The acoustic output module may include a speaker or an output terminal. According to an embodiment, the acoustic output module may include a plurality of speakers, and in this case, the acoustic output module may be arranged inside the main body, and sound emitted while covering at least a part of the vibration plate of the acoustic output module may pass through the waveguide and may be transmitted to the outside of the main body. The acoustic output module may include a plurality of acoustic output units, and as the plurality of acoustic output units are symmetrically arranged on the exterior of the main body, sound may be emitted in all directions, i.e., all directions in 360 degrees.

The power supply 160 may receive power from the outside, and provide power to the various components of the electronic apparatus 100. The power supply 160 according to an embodiment of the disclosure may receive power through various methods. As an example, the power supply 160 may receive power by using the connector 109 as illustrated in FIG. 1. Also, the power supply 160 may receive power by using a DC power code of 220V. However, the disclosure is not limited thereto, and the electronic apparatus may receive power by using a USB power code, or receive power by using a wireless charging method.

Also, the power supply 160 may receive power by using an internal battery or an external battery. The power supply 160 according to an embodiment of the disclosure may receive power through an internal battery. As an example, the power supply 160 may charge the power of the internal battery by using at least one of a DC power code of 220V, a USB power code, or a USB C-Type power code, and receive power through the charged internal battery. Also, the power supply 160 according to an embodiment of the disclosure may receive power through an external battery. As an example, if connection between the electronic apparatus and an external battery is performed through various wired communication methods such as a USB power code, a USB C-Type power code, a socket groove, etc., the power supply 160 may receive power through the external battery. That is, the power supply 160 may directly receive power from the external battery, or charge the internal battery through the external battery, and receive power from the charged internal battery.

The power supply 160 according to the disclosure may receive power by using at least one among the aforementioned plurality of power supplying methods. Regarding power consumption, the electronic apparatus 100 may have power consumption of a predetermined value (e.g., 43 W) or lower for the reasons of the socket form and other standards, etc. Here, the electronic apparatus 100 may vary the power consumption so that the power consumption can be reduced when using a battery. That is, the electronic apparatus 100 may vary the power consumption based on the power supplying method and the power usage amount, etc.

The electronic apparatus 100 according to an embodiment of the disclosure may provide various smart functions.

Specifically, the electronic apparatus 100 may be connected with a portable terminal apparatus for controlling the electronic apparatus 100, and the screen output at the electronic apparatus 100 may be controlled through a user input that is input at the portable terminal apparatus. As an example, the portable terminal apparatus may be implemented as a smartphone including a touch display, and the electronic apparatus 100 may receive screen data provided at the portable terminal apparatus from the portable terminal apparatus and output the data, and the screen output at the electronic apparatus 100 may be controlled according to a user input that is input at the portable terminal apparatus.

The electronic apparatus 100 may perform connection with the portable terminal apparatus through various communication methods such as Miracast, Airplay, wireless DEX, a remote PC method, etc., and share a content or music provided at the portable terminal apparatus.

Also, connection between the portable terminal apparatus and the electronic apparatus 100 may be performed by various connection methods. As an example, the electronic apparatus 100 may be searched at the portable terminal apparatus and wireless connection may be performed, or the portable terminal apparatus may be searched at the electronic apparatus 100 and wireless connection may be performed. Then, the electronic apparatus 100 may output the content provided at the portable terminal apparatus.

As an example, in a state wherein a specific content or music is being output at the portable terminal apparatus, if the portable terminal apparatus is located near the electronic apparatus, and then a predetermined gesture (e.g., a motion tab view) is detected through the display of the portable terminal apparatus, the electronic apparatus 100 may output the content or music that is being output at the portable terminal apparatus.

As an example, in a state wherein a specific content or music is being output at the portable terminal apparatus, if the portable terminal apparatus becomes close to the electronic apparatus 100 by a predetermined distance or shorter (e.g., a non-contact tab view), or the portable terminal apparatus contacts the electronic apparatus 100 twice at a short interval (e.g., a contact tab view), the electronic apparatus 100 may output the content or music that is being output at the portable terminal apparatus.

In the aforementioned embodiment, it was described that the same screen as the screen that is being provided at the portable terminal apparatus is provided at the electronic apparatus 100, but the disclosure is not limited thereto. That is, if connection between the portable terminal apparatus and the electronic apparatus 100 is constructed, a first screen that is provided at the portable terminal apparatus may be output at the portable terminal apparatus, and a second screen provided at the portable terminal apparatus that is different from the first screen may be output at the electronic apparatus 100. As an example, the first screen may be a screen provided by a first application installed on the portable terminal apparatus, and the second screen may be a screen provided by a second application installed on the portable terminal apparatus. As an example, the first screen and the second screen may be screens different from each other provided at one application installed on the portable terminal apparatus. Also, as an example, the first screen may be a screen including a UI in a form of a remote control for controlling the second screen.

The electronic apparatus 100 according to the disclosure may output a standby screen. As an example, in case connection between the electronic apparatus 100 and an external apparatus was not performed, or in case there is no input received from an external apparatus during a predetermined time, the electronic apparatus 100 may output a standby screen. The conditions for the electronic apparatus 100 to output a standby screen are not limited to the aforementioned examples, and a standby screen may be output by various conditions.

The electronic apparatus 100 may output a standby screen in a form of a blue screen, but the disclosure is not limited thereto. As an example, the electronic apparatus 100 may extract only a form of a specific object from data received from an external apparatus and obtain an atypical object, and output a standby screen including the obtained atypical object.

Figure 14:
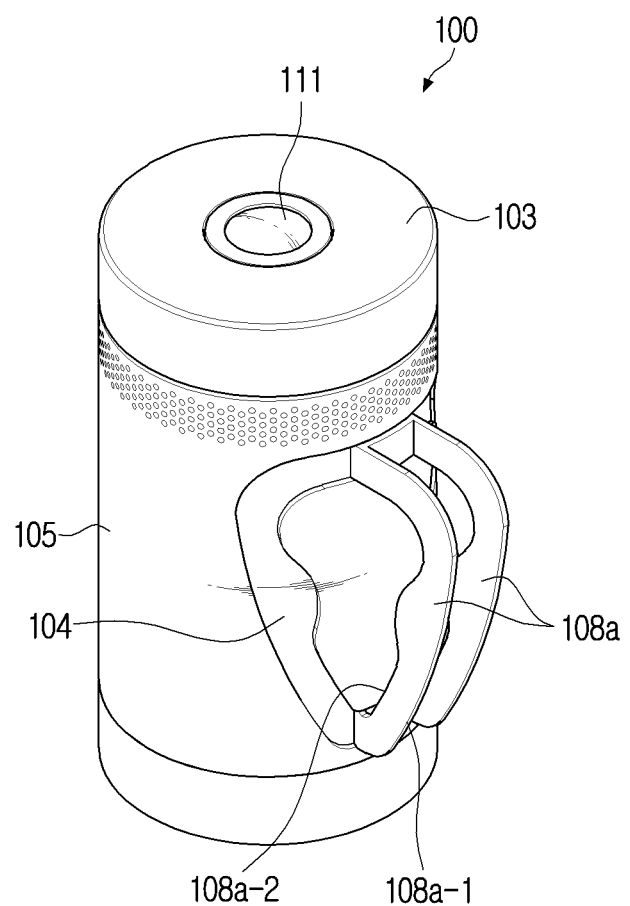
FIG. 14 is a perspective view illustrating an exterior of an electronic apparatus according to another embodiment of the disclosure.

FIG. 14 is a perspective view illustrating the exterior of the electronic apparatus 100 according to other embodiments of the disclosure.

Referring to FIG. 14, the electronic apparatus 100 may include a support (or, it may be referred to as "a handle") 108a.

The support 108a according to the various embodiments may be a handle or a ring that is provided so that a user can grip or move the electronic apparatus 100. Alternatively, the support 108a may be a stand that supports the main body 105 while the main body 105 is laid in the side surface direction.

The support 108a may be connected in a hinge structure so that it can be coupled to or separated from the outer circumferential surface of the main body 105, as illustrated in FIG. 14, and it may be selectively separated from or fixed to the outer circumferential surface of the main body 105 depending on a user's needs. The number, shape, or arrangement structure of the support 108a may be implemented in various ways without restriction. Also, according to an embodiment, the support 108a may be housed inside the main body 105, and a user can take it out and use it depending on needs, or the support 108a may be implemented as a separate accessory, and may be attached to or detached from the electronic apparatus 100.

The support 108a may include a first supporting surface 108a-1 and a second supporting surface 108a-2. The first supporting surface 108a-1 may be a surface that faces the outer direction of the main body 105 while the support 108a is separated from the outer circumferential surface of the main body 105, and the second supporting surface 108a-2 may be a surface that faces the inner direction of the main body 105 while the support 108a is separated from the outer circumferential surface of the main body 105.

The first supporting surface 108a-1 may get far from the main body 105 as it proceeds from the lower part of the main body 105 to the upper part of the main body 105, and the first supporting surface 108a-1 may have a shape that is flat or uniformly curved. In case the electronic apparatus 100 is held such that the outer side surface of the main body 105 contacts the bottom surface, i.e., in case the electronic apparatus 100 is arranged such that the projection lens 110 is toward the front surface direction, the first supporting surface 108a-1 may support the main body 105. In an embodiment including two or more supports 108a, the emission angle between the head 103 and the projection lens 110 can be adjusted by adjusting the interval or the hinge-opening angle between the two supports 108a.

The second supporting surface 108a-2 is a surface that contacts a user or an external holding structure when the support 108a is supported by the user or the external holding structure, and it may have a shape corresponding to the gripping structure of the user's hand or the external holding structure so that it is not slipped in the case of supporting or moving the electronic apparatus 100. The user may make the projection lens 110 face the front surface direction and fix the head 103, and move the electronic apparatus 100 while gripping the support 108a, and use the electronic apparatus 100 like a flashlight.

The support groove 104 is a groove structure that is provided on the main body 105, and that can accommodate the support 108a when it is not used, and it may be implemented as a groove structure corresponding to the shape of the support 108a on the outer circumferential surface of the main body 105, as illustrated in FIG. 14. Through the support groove 104, the support 108a can be kept on the outer circumferential surface of the main body 105 when the support 108a is not used, and the outer circumferential surface of the main body 105 can be maintained to be smooth.

Alternatively, the support groove 104 may have a structure of taking the support 108a to the outside of the main body 105 in a situation wherein the support 108a is kept inside the main body 105 and the support 108a is needed. In this case, the support groove 104 may be a structure that is retracted to the inside of the main body 105 so as to accommodate the support 108a, and the second supporting surface 108a-2 may include a door that opens or closes the support groove 104 that adjoins the outer circumferential surface of the main body 105 or that is located separately.

According to an embodiment, the electronic apparatus 100 may include various types of accessories that are helpful in using or keeping the electronic apparatus 100. For example, the electronic apparatus 100 may include a protection case so that the electronic apparatus 100 can be carried easily while being protected. Alternatively, the electronic apparatus 100 may include a tripod that supports or fixes the main body 105, or a bracket that is coupled to an outer surface and can fix the electronic apparatus 100.

Figure 15:
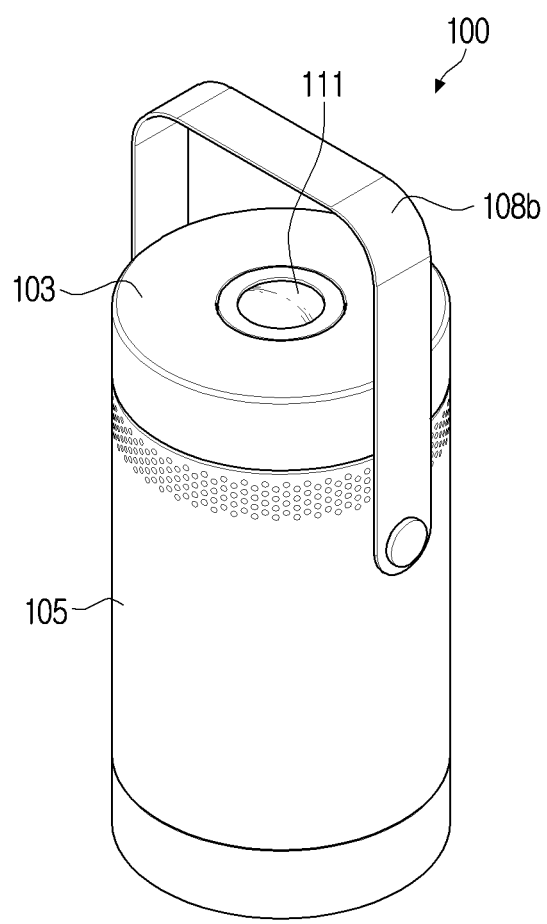
FIG. 15 is a perspective view illustrating an exterior of an electronic apparatus according to another embodiment of the disclosure.

FIG. 15 is a perspective view illustrating the exterior of the electronic apparatus 100 according to another embodiment of the disclosure.

Referring to FIG. 15, the electronic apparatus 100 may include a support 108b. According to an embodiment, the support may be referred to as a handle.

According to an embodiment, the support 108b may be a handle or a ring that is provided so that a user can grip or move the electronic apparatus 100. Alternatively, the support 108b may be a stand that supports the main body 105 to be directed to any angle while the main body 105 is laid in the side surface direction.

Specifically, as illustrated in FIG. 15, the support 108b may be connected with the main body 105 at a predetermined point of the main body 105 (e.g., the ⅔-¾ point of the height of the main body). When the support 108 rotates in the direction of the main body, the support 108b may support the main body 105 to be directed to any angle while the main body 105 is laid in the side surface direction.

Figure 16:
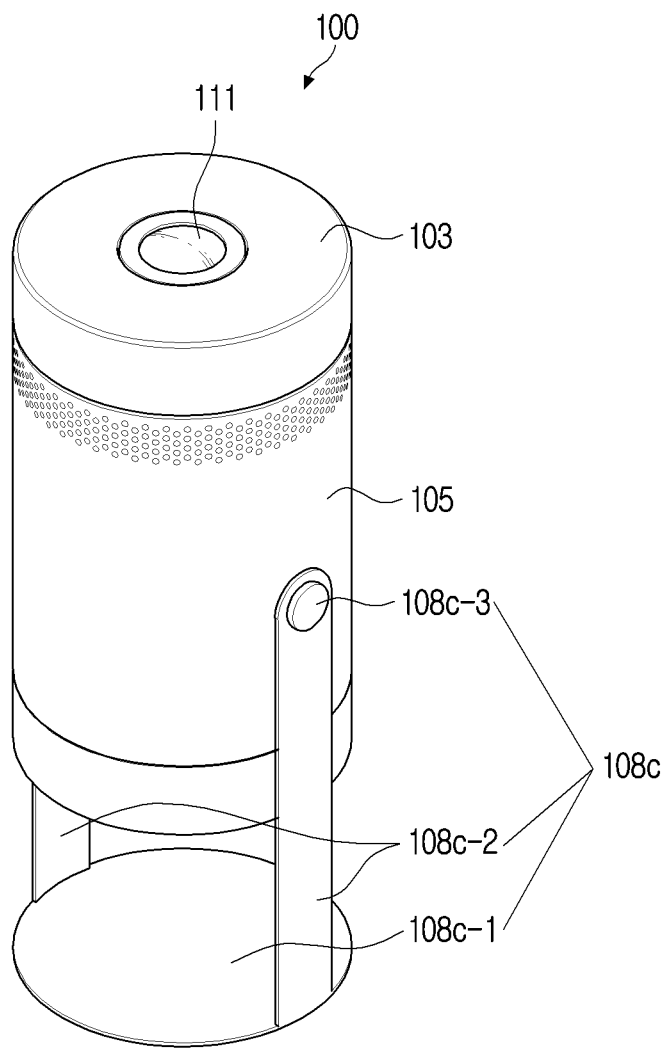
FIG. 16 is a perspective view illustrating an exterior of an electronic apparatus according to another embodiment of the disclosure.

FIG. 16 is a perspective view illustrating the exterior of the electronic apparatus 100 according to another embodiment of the disclosure.

Referring to FIG. 16, the electronic apparatus 100 may include a support 108c. According to an embodiment, the support may be (referred to as a holder. According to an embodiment, the support 108c may include a base plate 108c-1 provided to support the electronic apparatus 100 on the ground surface, and two supporting members 108c-2 connecting the base plate 108c-1 and the main body 105.

According to an embodiment of the disclosure, the heights of the two supporting members 108c-2 are the same, and thus one cross section of each of the two supporting members 108c-2 may be coupled or separated by the groove provided on one outer circumferential surface of the main body 105 and the hinge members 108c-3.

The two supporting members may be hinge-coupled to the main body 105 at the predetermined point of the main body 105 (e.g., the ⅓-¾ point of the height of the main body).

When the two supporting members and the main body are coupled by the hinge members 108c-3, the main body 105 may be rotated based on a virtual horizontal axis formed by the two hinge members 108c-3, and the emission angle of the projection lens 110 may be adjusted.

Figure 17A:
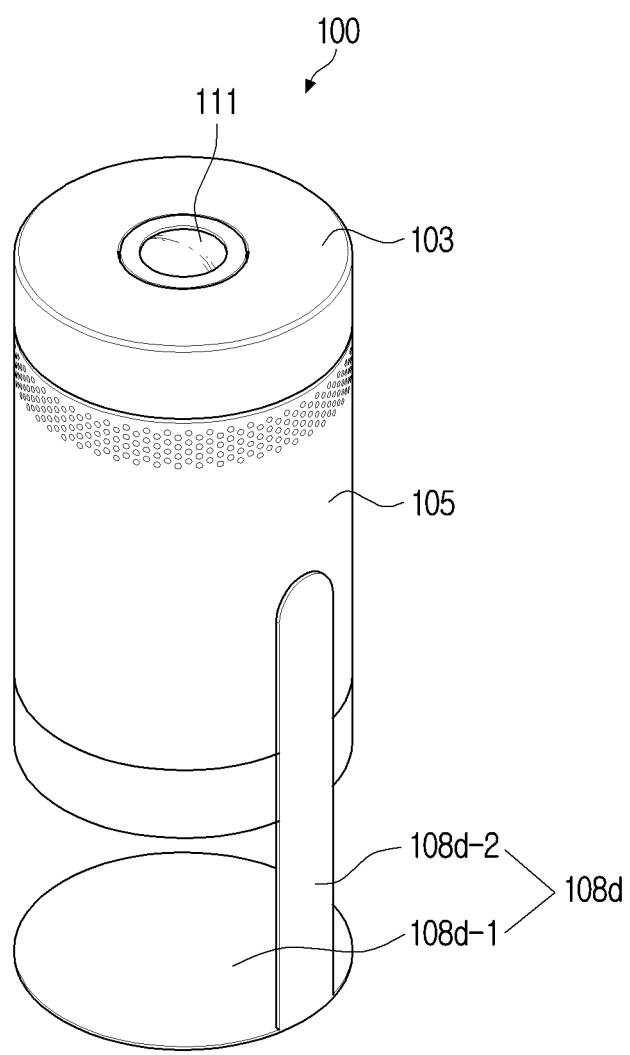
FIG. 17A is a perspective view illustrating an exterior of an electronic apparatus according to another embodiment of the disclosure.
Figure 17B:
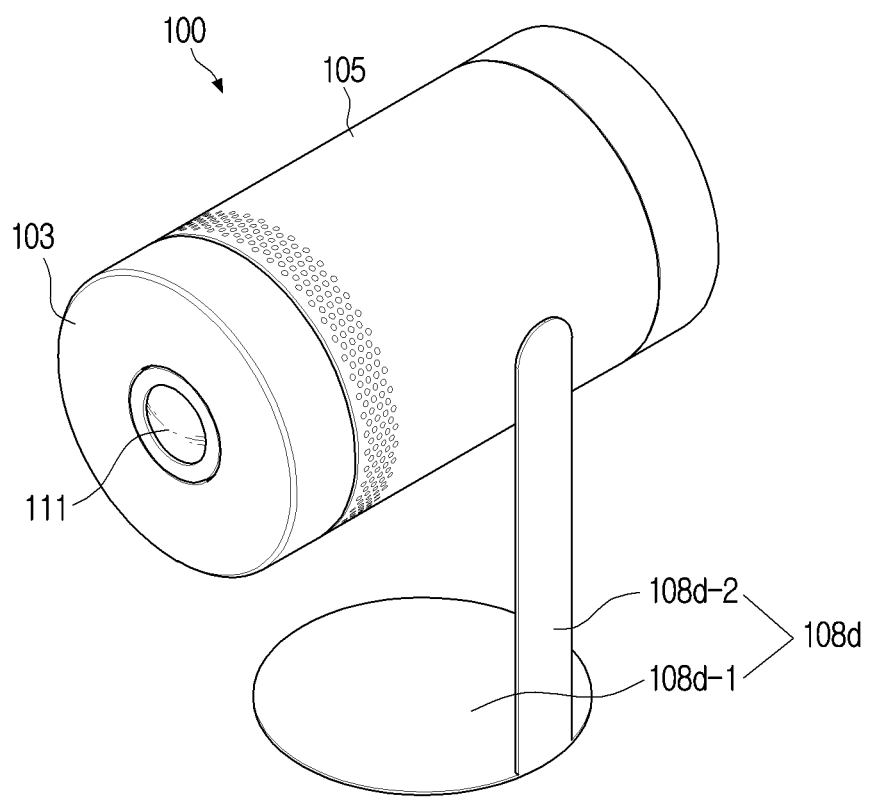
FIG. 17B is a perspective view illustrating a state wherein the electronic apparatus in FIG. 17A rotated.

FIG. 16 illustrates an embodiment wherein the two supporting members 108c-2 are connected with the main body 105, but the disclosure is not limited thereto, and one supporting member and the main body 105 may be connected by one hinge member as in FIG. 17A and FIG. 17B.

FIG. 17A is a perspective view illustrating the exterior of the electronic apparatus 100 according to another embodiment of the disclosure.

FIG. 17B is a perspective view illustrating a state wherein the electronic apparatus 100 in FIG. 17A rotated.

Referring to FIG. 17A and FIG. 17B, the support 108d according to an embodiment may include a base plate 108d-1 provided to support the electronic apparatus 100 on the ground surface, and one supporting member 108d-2 connecting the base plate 108d-1 and the main body 105.

Also, the cross section of the one supporting member 108d-2 may be coupled or separated by the groove provided on one outer circumferential surface of the main body 105 and the hinge member.

When the one supporting member 108d-2 and the main body 105 are coupled by the one hinge member, the main body 105 may be rotated based on a virtual horizontal axis formed by the one hinge member as in FIG. 17B.

The supports illustrated in FIG. 14, FIG. 15, FIG. 16, FIG. 17A, and FIG. 17B are merely examples, and the electronic apparatus 100 can obviously include supports in various locations or forms.

In case the electronic apparatus is manufactured in a cylindrical form as described in FIG. 12 to FIG. 17B, the distance sensors may be arranged in a form of enclosing the surroundings of the projection lens 111. In this case, distance values measured at the plurality of distance sensors may all vary according to the tilting or warping of the electronic apparatus, and accordingly, if an average value of such distance values is calculated, the distance from the center of the projection lens 111 to the screen can be calculated. Also, if the locations of each distance sensor and the distance among the sensors, and the sensing values of each sensor are comprehensively considered, the tilting may be assumed therefrom. The processor may perform a keystone correction by using the assumed tilting, distance, etc.

According to the various embodiments as described above, an electronic apparatus can assume the posture of the electronic apparatus even if there is no external apparatus like a camera or an image sensor attached on the electronic apparatus, etc., and correct an image in accordance thereto and output the image. Accordingly, an image that is not warped can be provided in a maximum size and a maximum resolution.

In case a program code for performing an image processing method according to the various embodiments as described above is installed on an electronic apparatus, the electronic apparatus can perform the aforementioned method by executing the program code. For example, if a program code for sequentially performing the operations of obtaining respectively an angle by which the electronic apparatus rotated in the direction of gravity and an angle by which the image output by the electronic apparatus is warped based on a screen, performing a keystone correction for an image based on the obtained angles, based on the image to be displayed on the screen exceeding an image display range inside the screen, adjusting the size of the image for which the keystone correction was performed, and projecting the image of which size was adjusted in the direction of the screen through the projector is installed on the electronic apparatus, the electronic apparatus can perform an accident reporting task.

Such a program code may be constituted as one application, and distributed on-line or in a state of being loaded on a recording medium, or it may be distributed in a state of being loaded on an electronic apparatus in a form of firmware. An electronic apparatus wherein such an application is installed can perform the aforementioned various image processing methods.

Also, the various embodiments as described above may be implemented in one apparatus as an integrated form or by being combined according to each of some embodiments, or they may be separately implemented according to each embodiment.

A program code as described above may be distributed while being recorded in computer-readable media in various types such as a ROM, a RAM, a memory chip, a memory card, an external hard, a hard, a CD, a DVD, a magnetic disc, or a magnetic tape, etc. An apparatus which downloaded such a program code on-line can also perform the aforementioned various operations.

Embodiments of the disclosure has been described with reference to the accompanying drawings, but the scope of the disclosure is intended to be determined by the appended claims, and is not intended to be interpreted as being limited to the aforementioned embodiments and/or drawings. Also, it should be clearly understood by a person having ordinary knowledge in the art that various alterations, modifications, and amendments of the disclosure may be made within the scope of the idea of the disclosure described in the claims.

What is claimed is:

1. An electronic apparatus comprising:
 a main body;
 a projector;
 a plurality of sensors comprising:
  an acceleration sensor configured to detect a sensing value, and
  a plurality of distance sensors configured to detect a distance value between the electronic apparatus and a screen;
 a support structure connected to an outer side surface of the main body through a hinge structure so that the main body is rotatable about the hinge structure, the support structure configured to support the main body on a supporting surface; and
 a processor configured to:
  identify a vertical angle by which the electronic apparatus is tilted based on a direction of gravity, based on the sensing value detected by the acceleration sensor,
  identify a rotation angle by which the electronic apparatus is rotated based on a distance between the screen and the electronic apparatus based on the distance value detected by the plurality of distance sensors,
  perform a function corresponding to a keystone correction for an image to provide a modified image,
  identify a size of the modified image based on at least one of the vertical angle or the rotation angle, and
  control the projector to project the modified image on the screen based on the identified size of the modified image.

2. The electronic apparatus of claim 1, wherein the processor is further configured to:
 identify whether the electronic apparatus moved based on a change in at least one of the sensing value or the distance value, and
 based on identifying that the electronic apparatus is in a halt state when there is no change in the sensing value and the distance value, perform the function corresponding to the keystone correction based on at least one of the vertical angle or the rotation angle.

3. The electronic apparatus of claim 2, wherein the processor is further configured to:
 detect the sensing value at a first time,
 detect a prior sensing value, by the acceleration sensor, at a second time before the first time,
 compare the prior sensing value detected at the second time and the sensing value detected at the first time, and
 identify whether the electronic apparatus moved based on a change between the prior sensing value and the sensing value.

4. The electronic apparatus of claim 1,
 wherein the plurality of distance sensors are arranged to be tilted by a predetermined first angle based on a bottom surface of the electronic apparatus, and
 wherein the processor is further configured to:
  correct the detected distance between the screen and the electronic apparatus based on the predetermined first angle of the plurality of distance sensors, and
  identify the rotation angle based on the corrected distance between the screen and the electronic apparatus.

5. The electronic apparatus of claim 1, further comprising:
a memory,
wherein the processor is further configured to:
based on a normal image being projected on the screen, store the distance between the screen and the electronic apparatus in the memory as a reference distance, identify vertex coordinates of the normal image based on the vertical angle and the rotation angle, and identify a range formed with the vertex coordinates of the normal image as a reference image display range and store the range in the memory.

6. The electronic apparatus of claim 5, wherein the processor is further configured to:
based on at least one of the vertical angle and the rotation angle not being 0, identify that the image projected on the screen is an abnormal image,
identify vertex coordinates of the abnormal image based on the vertical angle and the rotation angle, and
perform the function corresponding to the keystone correction based on the vertex coordinates of the abnormal image.

7. The electronic apparatus of claim 6, wherein the processor is further configured to:
identify the size of the modified image based on the stored reference image display range and the vertex coordinates of the abnormal image.

8. The electronic apparatus of claim 7, wherein the processor is further configured to:
based on all of the vertex coordinates of the abnormal image being within the reference image display range, control the size of the modified image to display the modified image in a maximum size within the reference image display range based on a predetermined scale parameter.

9. A method for controlling an electronic apparatus, the method comprising:
identifying a vertical angle by which the electronic apparatus is tilted based on a direction of gravity, based on a sensing value detected by an acceleration sensor, the electronic apparatus including a main body and a support structure connected an outer side surface of the main body through a hinge structure so that the main body is rotatable about the hinge structure;
identifying a rotation angle by which the electronic apparatus is rotated based on a distance between a screen and the electronic apparatus based on a distance value detected by a plurality of distance sensors;
performing a function corresponding to a keystone correction for an image to provide a modified image;
identifying a size of the modified image based on at least one of the vertical angle or the rotation angle; and
projecting the modified image on the screen based on the identified size of the modified image.

10. The method for controlling an electronic apparatus of claim 9, further comprising:
identifying whether the electronic apparatus moved based on a change in at least one of the sensing value or the distance value, and
based on identifying that the electronic apparatus is in a halt state when there is no change in the sensing value and the distance value, performing the function corresponding to the keystone correction based on at least one of the vertical angle or the rotation angle.

11. The method for controlling an electronic apparatus of claim 10, wherein the identifying whether the electronic apparatus moved comprises:
detecting the sensing value at a first time,
detecting a prior sensing value, by the acceleration sensor, at a second time before the first time,
comparing the prior sensing value detected at the second time and the sensing value detected at the first time, and
identify whether the electronic apparatus moved based on a change between the prior sensing value and the sensing value.

12. The method for controlling an electronic apparatus of claim 9, wherein the identifying the rotation angle comprises:
correcting the detected distance between the screen and the electronic apparatus based on a predetermined first angle of the plurality of distance sensors arranged to be tilted by the predetermined first angle based on a bottom surface of the electronic apparatus, and
identifying the rotation angle based on the corrected distance between the screen and the electronic apparatus.

13. The method for controlling an electronic apparatus of claim 9, further comprising:
based on a normal image being projected on the screen, storing the distance between the screen and the electronic apparatus as a reference distance; and
identifying vertex coordinates of the normal image based on the vertical angle and the rotation angle, and
identifying a range formed with the vertex coordinates of the normal image as the reference image display range and storing the range.

14. The method for controlling an electronic apparatus of claim 13, further comprising:
based on at least one of the vertical angle and the rotation angle not being 0, identifying that the image projected on the screen is an abnormal image,
identifying vertex coordinates of the abnormal image based on the vertical angle and the rotation angle, and
performing the function corresponding to the keystone correction based on the vertex coordinates of the abnormal image.

15. The method for controlling an electronic apparatus of claim 14, further comprising:
identifying the size of the modified image based on the stored reference image display range and the vertex coordinates of the abnormal image.

16. The method for controlling an electronic apparatus of claim 15, further comprising:
based on all of the vertex coordinates of the abnormal image being within the reference image display range, controlling the size of the modified image to display the modified image in a maximum size within the reference image display range based on a predetermined scale parameter.

17. A non-transitory computer-readable storage medium having recorded thereon a program that is executed by a processor of an electronic apparatus to perform a method comprising:
identifying a vertical angle by which the electronic apparatus is tilted based on a direction of gravity, based on a sensing value detected by an acceleration sensor, the electronic apparatus including a main body and a support structure connected an outer side surface of the main body through a hinge structure so that the main body is rotatable about the hinge structure;
identifying a rotation angle by which the electronic apparatus is rotated based on a distance between a screen and the electronic apparatus based on a distance value detected by a plurality of distance sensors;

performing a function corresponding to a keystone correction for an image to provide a modified image;
identifying a size of the modified image based on at least one of the vertical angle or the rotation angle; and
projecting the modified image on the screen based on the identified size of the modified image.

\* \* \* \* \*